United States Patent [19]
Newell et al.

[11] Patent Number: 5,159,560
[45] Date of Patent: Oct. 27, 1992

[54] AUTOMATED MERCHANDISE DISPENSING AND RETRIEVAL SYSTEM

[76] Inventors: William C. Newell, 750 S. Pleasant View, Post Falls, Id. 83854; Jesse A. Ojala, 1423 Randle, Coeur d'Alene, Id. 83814

[21] Appl. No.: 543,263
[22] Filed: Jun. 25, 1990
[51] Int. Cl.$^5$ ............................................. G06F 15/24
[52] U.S. Cl. ................................... 364/479; 364/138; 340/825.06; 222/144; 221/119; 221/122
[58] Field of Search ........................ 364/479, 138, 403; 235/381; 340/825.06; 222/144, 144.5; 221/92, 93, 119, 120, 121, 122

[56] References Cited
U.S. PATENT DOCUMENTS

| | | | |
|---|---|---|---|
| 4,306,219 | 12/1981 | Main et al. | 340/825.54 |
| 4,359,631 | 11/1982 | Lockwood et al. | 235/381 |
| 4,412,292 | 10/1983 | Sedam et al. | 364/479 |
| 4,814,592 | 3/1989 | Bradt et al. | 235/381 |
| 4,853,684 | 8/1989 | Hoppstadter | 340/825.35 |

Primary Examiner—Jerry Smith
Assistant Examiner—Paul Gordon
Attorney, Agent, or Firm—Graybeal Jackson Haley & Johnson

[57] ABSTRACT

A system from which a customer may rent and return videocassettes. The system has a plurality of vending machines for dispensing and receiving videocassettes including a carousel rotated about a horizontal axis and having bins for storage of videocassettes and access doors for dispensing and receiving videocassettes. A computer controlled positioning system scans a barcode ring affixed to the carousel and an aperture detector counts the passage of apertures in a ring about the carousel for determining the position of the carousel. The control computer also maintains an inventory database which tracks inventory in the bins by scanning barcodes affixed to the each videocassette and viewable via an opening at each bin location. A host computer communicates with machine control computers for maintaining a system wide inventory database, communicating with financial institutions for customer billing purposes, logging machine faults and controlling inter-vending of videocassettes, wherein inter-vending permits videocassettes rented from one machine within the system to be returned to another machine in the system and be re-rented from that machine with automatic adjustment of the inventory databases.

20 Claims, 27 Drawing Sheets

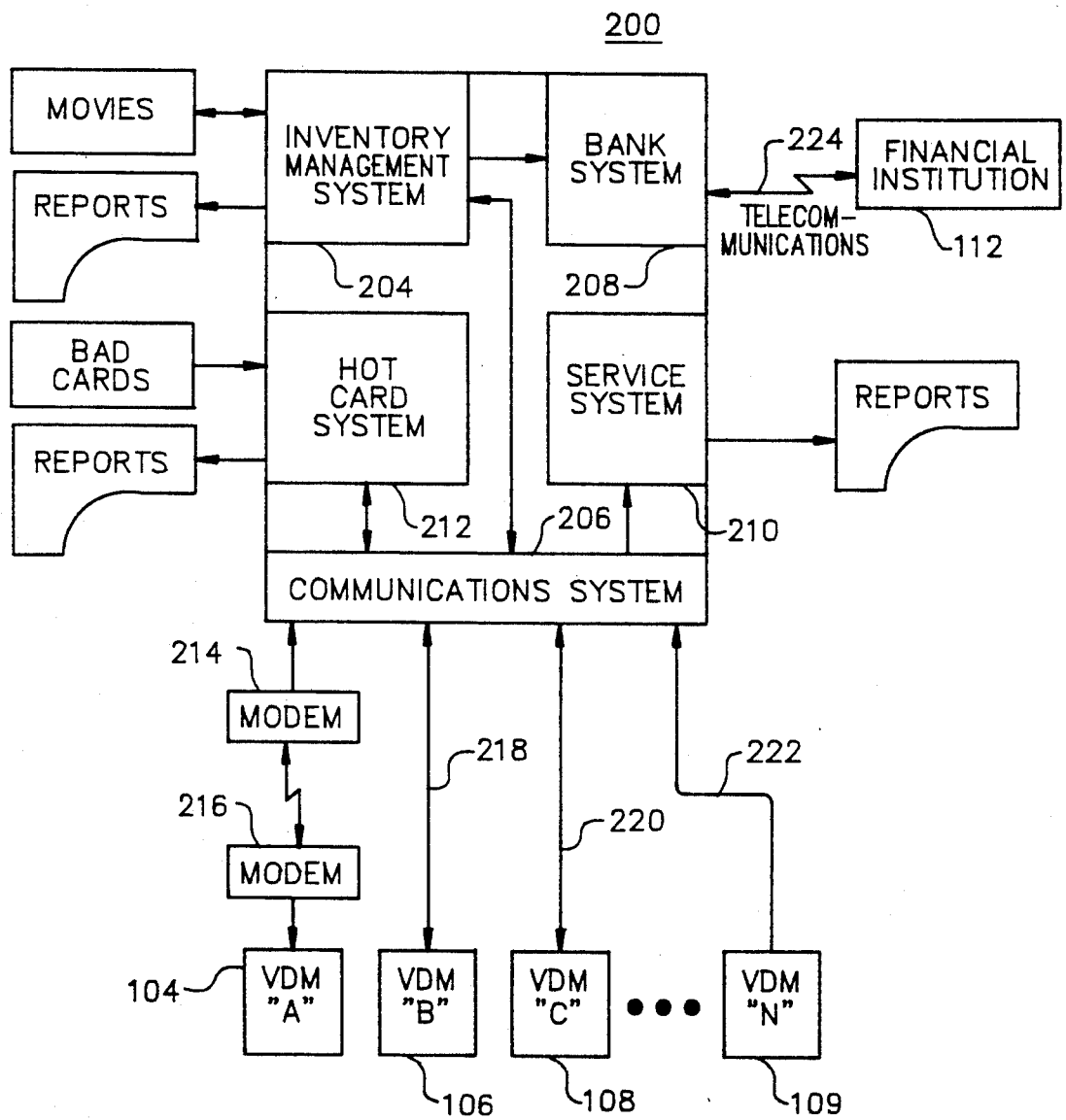

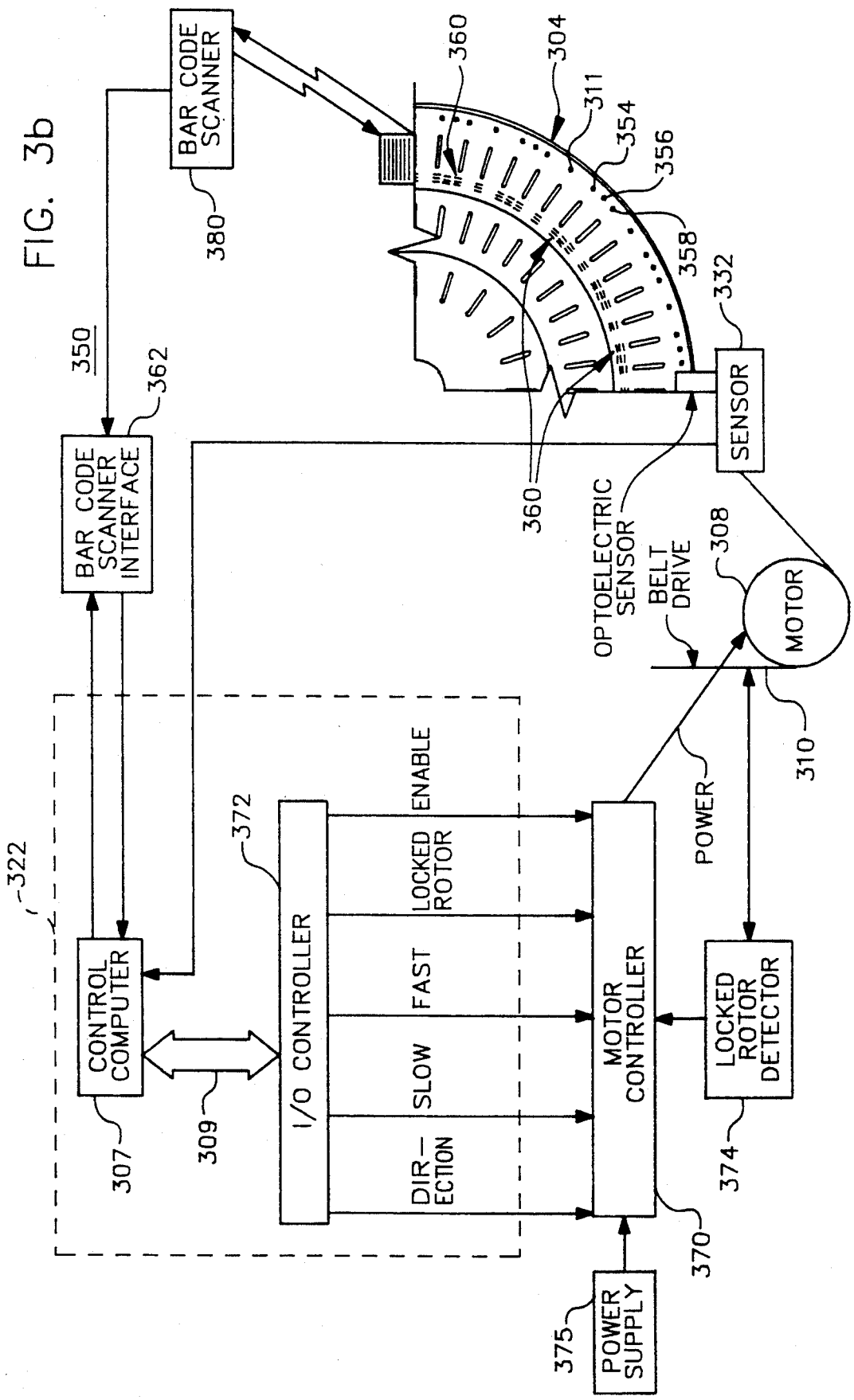

FIG. 3c

| RING 1 (INNER RING) | | | RING 2 (MIDDLE RING) | | | | | | RING 3 (OUTER RING) | | | | | |
|---|---|---|---|---|---|---|---|---|---|---|---|---|---|---|
| TITLE | PHY-SICAL BIN | BAR CODE NUMBER | TITLE | PHY-SICAL BIN | BAR CODE NUMBER | TITLE | PHY-SICAL BIN | BAR CODE NUMBER | TITLE | PHY-SICAL BIN | BAR CODE NUMBER | TITLE | PHY-SICAL BIN | BAR CODE NUMBER |
| AA | 1 | 01 | BA | 21 | 01 | CA | 41 | 41 | DA | 61 | 01 | EA | 81 | 28 | FA | 101 | 54 |
| AB | 2 | 05 | BB | 22 | 03 | CB | 42 | 43 | DB | 62 | 02 | EB | 82 | 29 | FB | 102 | 56 |
| AC | 3 | 09 | BC | 23 | 05 | CC | 43 | 45 | DC | 63 | 04 | EC | 83 | 30 | FC | 103 | 57 |
| AD | 4 | 13 | BD | 24 | 07 | CD | 44 | 47 | DD | 64 | 05 | ED | 84 | 32 | FD | 104 | 58 |
| AE | 5 | 17 | BE | 25 | 09 | CE | 45 | 49 | DE | 65 | 06 | EE | 85 | 33 | FE | 105 | 60 |
| AF | 6 | 21 | BF | 26 | 11 | CF | 46 | 51 | DF | 66 | 08 | EF | 86 | 34 | FF | 106 | 61 |
| AG | 7 | 25 | BG | 27 | 13 | CG | 47 | 53 | DG | 67 | 09 | EG | 87 | 36 | FG | 107 | 62 |
| AH | 8 | 29 | BH | 28 | 15 | CH | 48 | 55 | DH | 68 | 10 | EH | 88 | 37 | FH | 108 | 64 |
| AI | 9 | 33 | BI | 29 | 17 | CI | 49 | 57 | DI | 69 | 12 | EI | 89 | 38 | FI | 109 | 65 |
| AJ | 10 | 37 | BJ | 30 | 19 | CJ | 50 | 59 | DJ | 70 | 13 | EJ | 90 | 40 | FJ | 110 | 66 |
| AK | 11 | 41 | BK | 31 | 21 | CK | 51 | 61 | DK | 71 | 14 | EK | 91 | 41 | FK | 111 | 68 |
| AL | 12 | 45 | BL | 32 | 23 | CL | 52 | 63 | DL | 72 | 16 | EL | 92 | 42 | FL | 112 | 69 |
| AM | 13 | 49 | BM | 33 | 25 | CM | 53 | 65 | DM | 73 | 17 | EM | 93 | 44 | FM | 113 | 70 |
| AN | 14 | 53 | BN | 34 | 27 | CN | 54 | 67 | DN | 74 | 18 | EN | 94 | 45 | FN | 114 | 72 |
| AO | 15 | 57 | BO | 35 | 29 | CO | 55 | 69 | DO | 75 | 20 | EO | 95 | 46 | FO | 115 | 73 |
| AP | 16 | 61 | BP | 36 | 31 | CP | 56 | 71 | DP | 76 | 21 | EP | 96 | 48 | FP | 116 | 74 |
| AQ | 17 | 65 | BQ | 37 | 33 | CQ | 57 | 73 | DQ | 77 | 22 | EQ | 97 | 49 | FQ | 117 | 76 |
| AR | 18 | 69 | BR | 38 | 35 | CR | 58 | 75 | DR | 78 | 24 | ER | 98 | 50 | FR | 118 | 77 |
| AS | 19 | 73 | BS | 39 | 37 | CS | 59 | 77 | DS | 79 | 25 | ES | 99 | 52 | FS | 119 | 78 |
| AT | 20 | 77 | BT | 40 | 39 | CT | 60 | 79 | DT | 80 | 26 | ET | 100 | 53 | FT | 120 | 80 |

352

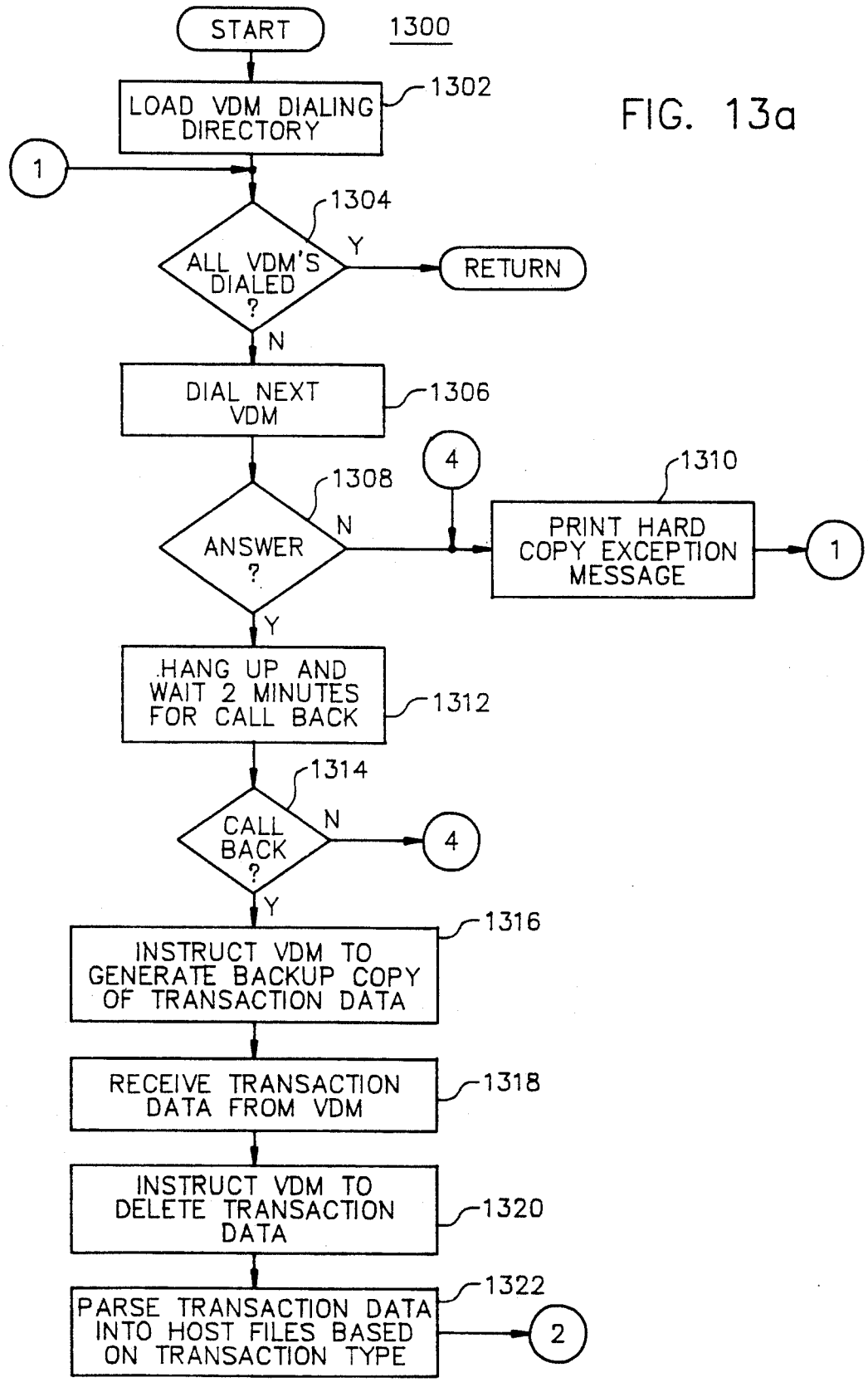

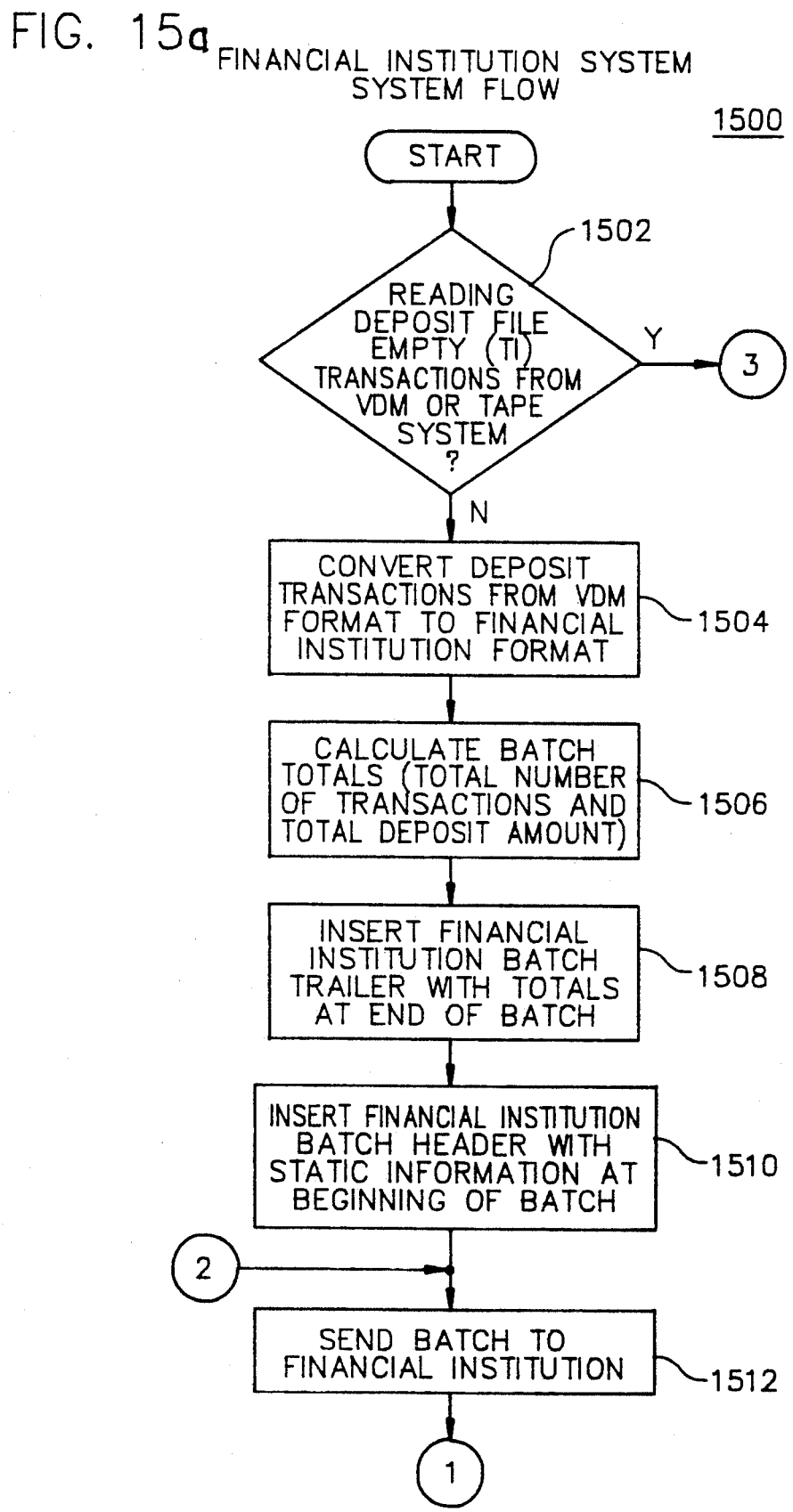
FIG. 15a FINANCIAL INSTITUTION SYSTEM SYSTEM FLOW

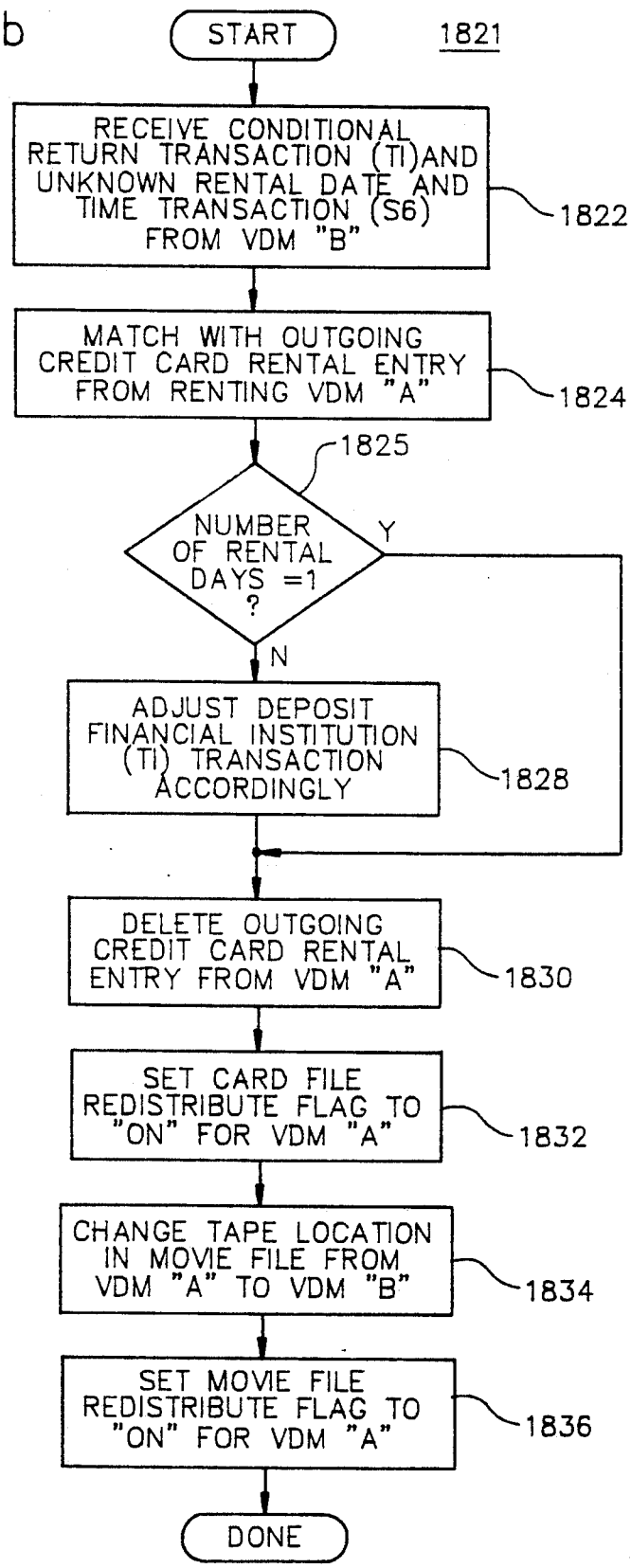
FIG. 18b INTER-VDM TAPE RENTAL AND RETURN SYSTEM FLOW – HOST

AUTOMATED MERCHANDISE DISPENSING AND RETRIEVAL SYSTEM

DESCRIPTION

1. Technical Field

This invention relates to the field of vending machines and more particularly to a vending machine network which automatically manages inventory, monitors system reliability, and which collects customer payments and transmits them to a central location.

2. Background of the Invention

Vending machines have been used in the past for dispensing food items as well as many other articles. Typically, vending machines are operated autonomously, wherein inventory for each machine is typically maintained individually. Typically, each machine in the system must be manually restocked and maintained, wherein a failed vending machine may not be discovered until actually visited by service personnel. Furthermore, since no mechanism exists for automatically determining which items are the most popular, the use of prior vending machines is typically inefficient, since the most popular items may be out of stock well before the typical restocking interval.

Recently, with the rapid expansion of home video technologies, the rental of items such as videotapes, videodisks and video game cartridges has become widespread. It has been found that vending machines are useful for dispensing these types of articles. However, present vending machine systems have several significant problems.

In the video rental industry, a videotape, cartridge or disk is typically issued to a customer for a predetermined rental period. It is often desirable to determine which videotapes, disks, etc., are rented the most frequently so that inventory stocks may be adjusted accordingly. Furthermore, customers may often wish to return a rented item to a location other than the original rental location.

No system is known which allows a number of vending machines, operating in diverse locations, to be used for dispensing and retrieving articles while allowing an article acquired from one vending machine to be returned to another in the system, while automatically tracking the location of each inventory item in the system, and simultaneously accumulating statistics as to the frequency of rental for specific items. Furthermore, no vending machine system is known which allows system reliability statistics to be automatically reported to a central location wherein vending machines having mechanical problems may be identified and repaired prior to total failure.

SUMMARY OF THE INVENTION

Accordingly, it is an object of the present invention to provide an improved vending machine system which provides automatic inventory tracking.

It is another object of the present invention to provide an improved vending machine system which automatically tracks and reports reliability statistics for each vending machine in the system.

It is still another object of the present invention to provide centralized billing in a vending machine system.

In accordance with an embodiment of the present invention, a self-contained, automated vending apparatus is provided, having a carousel oriented on a vertical plane for rotation along a horizontal axis for storing and dispensing articles, including the means for no-fault positioning of the carousel, ensuring reliable article dispensing and return operations, and further providing for the return of such articles to one of a plurality of randomly selected and circumferentially spaced compartments arranged within at least one concentric ring circumscribing the carousel axis. Furthermore, the carousel apparatus coupled with the carousel driving apparatus comprises the sole moving mechanical component within the overall vending apparatus, thereby enhancing reliability of operations. The present invention also includes the means to link a plurality of vending apparatuses within an electronic data communications network, providing a means for data transmission between each vending apparatus and a remotely and centrally located processing apparatus for the provision of management information to such processing apparatus, based on individual or aggregate vending apparatuses connected to the networking system, such that information can include, for example, performance data on articles, error and service reports, and inventory data whereby the following capabilities are provided: (i) an article, typically a videocassette movie for rental, is dispensed from one vending apparatus and can be returned to another vending apparatus within the network, and (ii) a patron informed that a particular article selection is not then available from the present vending apparatus can be informed of the availability of the same article from another vending apparatus linked within the network.

The present invention additionally includes various publicly available, "off-the-shelf" components, providing for easy maintenance and reduced technological risk, because such components are in a mature developmental state, i.e., proven from a functional and performance standpoint, easily and economically available, and fully supported in respect to documentation and a wide array of software or hardware, as the case may be, which can be used in connection with such respective components. No other vending apparatus presently available, in particular videocassette vending apparatuses, is so configured and designed around such widely available components.

BRIEF DESCRIPTION OF THE DRAWINGS

The above and other objects may be fully understood through the detailed description of the invention below and the accompanying drawings in which:

FIG. 2 is a diagram of the structure of the software which controls the operation of the system of FIG. 1.

FIG. 3B is a diagram of the positioning system used by the vending machine of FIG. 3A.

FIG. 3C is a diagram of a look-up table used by the positioning system of FIG. 3B.

FIGS. 13A-13C are a series of flow diagrams detailing the operation of the host system while communicating with the dispensing machines.

FIGS. 15A-15B are a series of flow diagrams detailing the process for submitting accumulated card charges to an associated financial institution for reimbursement in the system of the present invention.

FIGS. 18A and 18B are flow diagrams detailing the process by which inventory records are updated when an article is removed from one dispensing machine and returned to another.

DETAILED DESCRIPTION OF THE INVENTION

Figure 1:
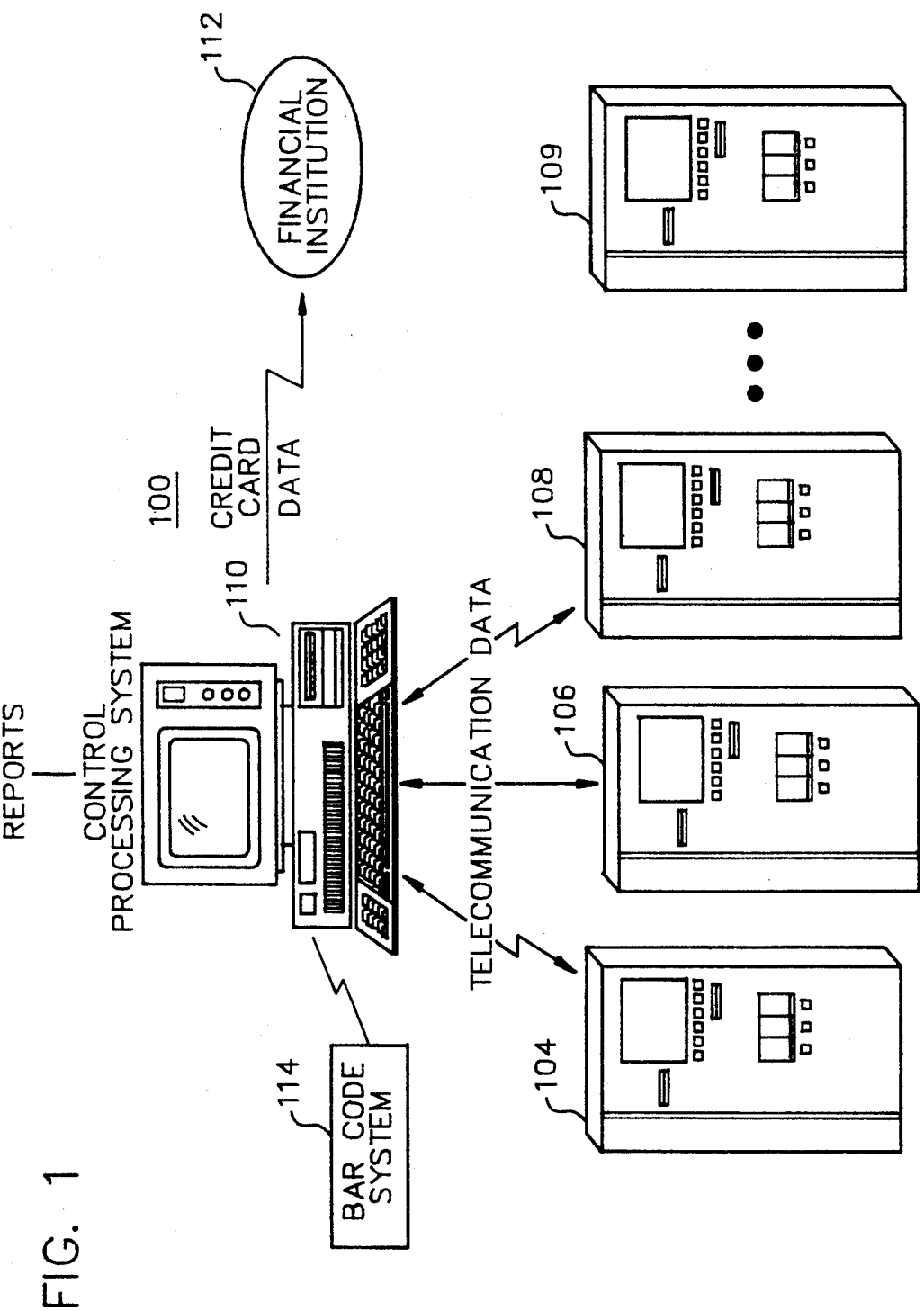
FIG. 1 is a block diagram of the automated vending machine network of the present invention.

The present invention provides a vending machine network which includes automatic inventory management, billing management and system maintenance. The system 100 includes a plurality of vending machines (e.g. vending machines 104-109) which are preferably adapted for renting articles such as videotapes, discs, cartridges, etc. Each vending machine (104-109) in the system 100 is capable of autonomous operation and includes means for receiving and dispensing articles, means for tracking which inventory items have been rented or are in stock, (or returned to stock) means for monitoring operational characteristics of the vending machine, and means for tracking and reporting customer billing information. The specific subsystems of vending machines 104-109 are discussed in more detail below. While the system 100 is shown with four exemplary vending machines, those skilled in the art will appreciate that the system 100 can be expanded to accommodate virtually any number of vending machines.

Each vending machine 104-109 in system 100 includes means for communicating information to control processing system 110 wherein each vending machine 104-109 periodically accesses control processing system 110 to report vending machine activity since the last reporting period. For example, each vending machine is provided with an inventory of articles such as videotapes for rental. When an article is rented, the vending machine records which item was rented, as well generating and storing billing information for the transaction. In the preferred practice of the present invention, customer billing is implemented with conventional credit, debit or membership cards wherein the cost for renting an article is billed to a customer's card account. Accordingly, during a typical rental transaction, the customer's card is read and the number is stored in a transaction file for later presentment to a financial institution 112. Each vending machine 104-109 also maintains an operating file which records internal operational errors.

Periodically, each of the respective vending machines 104-109 access the control processing system 110 to report any vending machine activity since the last reporting period. In the preferred practice of the present invention, communication between the control processing system 110 and the respective vending machines 104-109 is implemented with conventional telephone lines and modems, although dedicated lines would also function satisfactorily. During a typical communications session, each of the vending machines reports a variety of information to the control and processing system 110. For example, a typical communications session may include reports of the current inventory of the vending machine, (including which items were rented or returned since the last reporting period) any operational failures, and the credit or debit card data for each rental transaction. The control processing system 110 processes this information in a number of ways. The inventory reports may be used to update the inventory records of the control processing system 110 and the vending machine. For example, if an article is rented in one vending machine and returned to another, it must be removed from the inventory record of the vending machine from which it was rented.

The operational failure records may be used to compile machine operational characteristics at the control processing system 110, wherein service personal are sent to the vending machine if recurring failures are reported. Finally, the credit or debit card data is compiled by the control processing system 110 for each vending machine in the system and presented to a financial institution 112 for payment. Preferably, the credit or debit card data is sent to financial institution 112 via a communications link, such as one provided by a telephone line and modem, although virtually any method of transferring data, such as magnetic tape or printed reports, would also be satisfactory.

In the preferred practice of the present invention, each inventory article is identified by a unique identification number which is encoded in accordance with the Universal Product Code (UPC) in conjunction with a unique tape identifier number, and which is affixed to each article in the form of a conventional bar code strip. Accordingly, as new items are added to or removed from the system 100, the respective bar codes corresponding to each article may be scanned by bar code system 114 for processing by control processing system 110 when updating inventory files.

Referring now to FIG. 2, in the system 100, the control processing system 110 is controlled by system which provides five primary functions. One function of system 200 is inventory management system 204 and the communications system 206 which cooperate to control the traffic of articles throughout the system 100. For example, in the preferred practice of the present invention, the dispensing machines 104-109 may be used in a videotape rental network wherein videotapes may be rented and then returned to the system. The present invention provides a method and means whereby a videotape may be acquired from one machine in the network and returned to another wherein the system 100 tracks the actual location of the videotape. This function is provided by the inventory management system 204 and the communications system 206 which may communicate with the respective vending machines via modems 214, 216 or via dedicated lines 218-222.

During the typical operation of the system 100, users charge the cost of the rental on a credit, debit or membership card. These transactions are recorded by bank system 208. In addition, bank system 208 communicates with a financial institution 112 for preauthorization of the transaction (where desired) and for reimbursement for the card-based transactions. Communication with the financial institution 112 is preferably conducted over telephone communication lines 224, although other media such as magnetic tape may also be used. In addition, the system 200 includes system support functions such as automatic service request generation controlled by service system 210 and hot-card tracking provided by hot-card system 212. The detailed operation of each of the systems mentioned above is discussed in detail below.

Figure 3A:
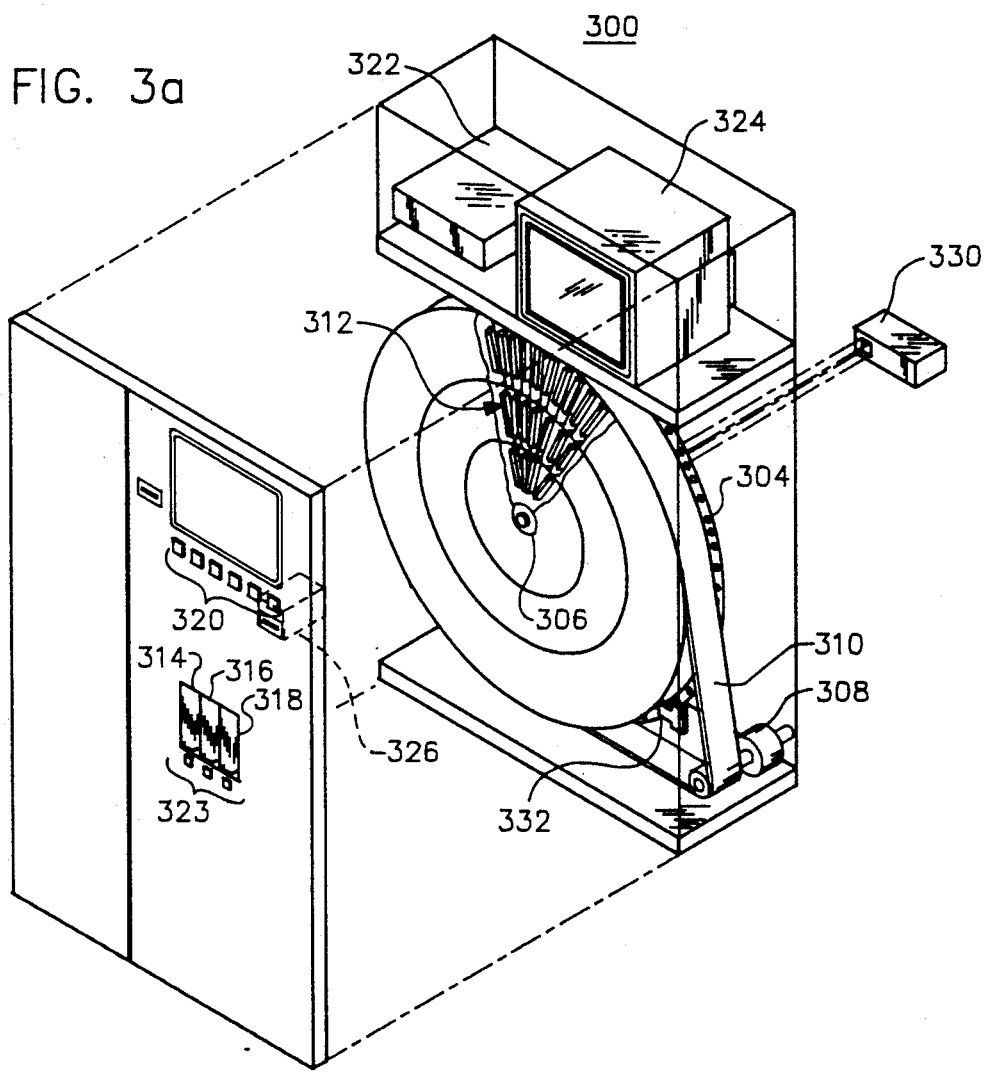
FIG. 3A is an isometric view of a vending machine adapted for use with the system of the present invention.

Referring now to FIG. 3A, a vending machine adapted for use with the present invention is shown. A pseudo-code listing of the control software for controlling the respective vending machines is set forth in Appendix 4 and is also described in conjunction with the flow diagrams discussed below. The vending machine 300 incorporates a carousel 304 which is rotatably supported on spindle 306 wherein the carousel 304 is coupled to a conventional D.C. motor 308 with belt 310. The belt 310 may be constructed of any of a number of materials and preferably comprises a conventional v-belt. The angular position of carousel 304 is adjusted by selectively activating the D.C. motor 308 wherein the direction of travel of carousel 304 is controlled by the polarity of the voltage across D.C. motor 308.

The carousel 304 may preferably be configured with a plurality of bins 312 arranged in a plurality of concentric rings wherein the bins 312 are adapted for storing articles to be dispensed, such as videotapes. The bins 312 are aligned with doors 314-318 such that individual bins are aligned with doors 314-318 when the carousel 304 is in a predetermined position, so articles may be stored in or removed from the bins 312 through doors 314-318. As in prior vending machines, articles may be selected with exemplary controls 320 which are coupled to a control system 322. For example, controls may be provided for allowing a user to rent, return, preview, move the cursor on the display screen, choose additional selections, or to cancel previous entries. In addition, status lights 323 may be included to indicate when a desired article is behind a respective access door 314-318. The dispensing machine 300 may also include a video display 324 for displaying system status information and a magnetic card reader 326 for receiving customer account information.

As will be discussed in more detail below, the improved positioning system of the present invention incorporates a bar code scanner 380 and an aperture sensor 332 for detecting the position of carousel 304.

Referring now to FIGS. 3B-3C, the positioning system 350 includes carousel 304 having a plurality of apertures (e.g., apertures 311, 354-358) disposed about the perimeter of the carousel 304, and a carousel position bar code ring 360 disposed coaxially with respect to the plurality of apertures wherein each aperture is aligned with a particular bar code area. The bar codes of the bar code ring 360 as well as the apertures 311, 354-358 are disposed in a pattern of three bar code areas/apertures, separated by a space, followed by three bar code areas/apertures, etc. This arrangement is useful to encode the position of three offset concentric bin rings within carousel 304.

The system 350 includes sensor 332 which detects when the sensor 332 is aligned with an aperture. The bar code scanner 380 reads the bar code currently aligned with the bar code scanner 380. A control computer 307 receives inputs from the sensor 332 as well as the bar code scanner interface 362. The bar code scanner interface 362 receives inputs from the bar code scanner 380 and converts the TTL output signal of scanner 380 to an ASCII signal processed by control computer 307. A bar code scanner and bar code interface suitable for use with the present invention is the MS-500 scan head and the MS-2000 decoder available from Microscan Systems, Inc., 939 Industry Drive, Tukwila, Wash. 98188. The position of carousel 304 is controlled by motor 308 which is coupled to carousel 304 via belt 310. The belt 310 is preferably of the well-known v-belt type.

The motor 308 is responsive to signals developed by D.C. motor controller 370 which is in turn controlled by control computer 307 through I/O controller 372. I/O controller 372 is a conventional computer interface device which communicates with control computer 307 through data bus 309. An I/O controller suitable for use with the present invention is available from Metrabyte, 440 Myles Standish Blvd., Taunton, Mass. 02780. The I/O controller 372 receives commands from control computer 307 and in response thereto generates a plurality of motor control signals. Specifically, motor controller 370 generates a positive or negative D.C. voltage for actuating D.C. motor 308, as well as generating various status signals regarding the state of the system. Specifically, the motor controller 370 receives as inputs an enable signal, a direction control signal, and a signal for effecting fast and slow operating modes. In addition, motor controller 370 outputs a signal which indicates whether the motor rotor is locked. A conventional power supply 375 provides power to the system 350.

Figure 11:
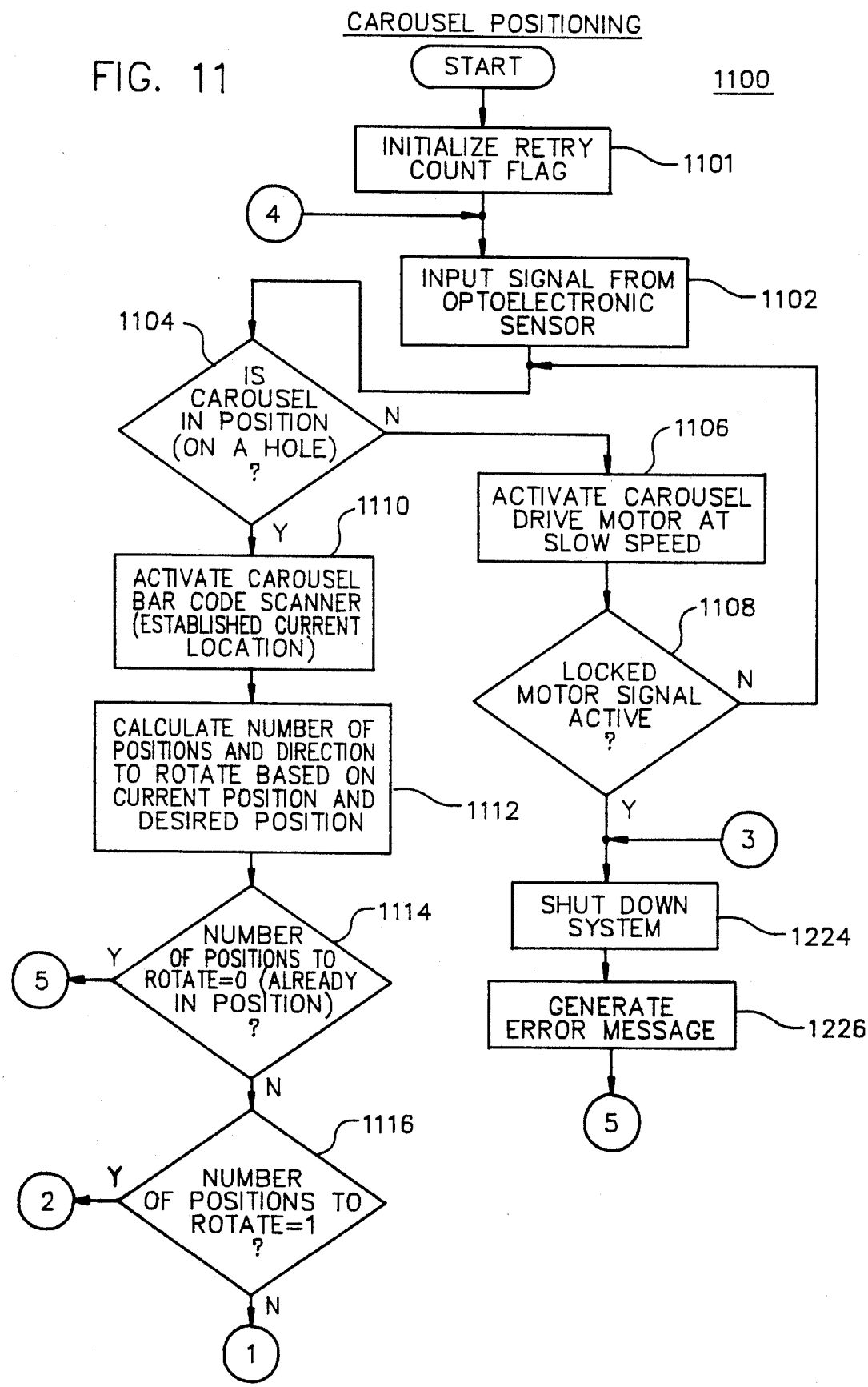
FIG. 11 is a flow diagram of the carousel positioning system of the vending machine described in conjunction with FIG. 3A.

The detailed operation of the system 350 is described in more detail in conjunction with FIG. 11. Briefly, the initial carousel position is determined by aligning the sensor 332 with an aperture and by reading the bar code in code ring 360 corresponding with that position. In use, a user signals control computer 307 to move the carousel 304 to a predetermined position as is discussed in more detail below. Each valid position of carousel 304 is indicated by the carousel code ring 360. The control computer 307 then calculates the number of apertures between the current position and a desired position based on data stored in a look-up table 352 of the type shown in FIG. 3C. Table 352 is created as inventory is loaded into carousel 304. As each item is loaded in the carousel 304, the bar code corresponding to its position is recorded in the look-up table 352. Table 352 may be utilized as follows. It is determined where the carousel 304 is presently located by reading the bar code at the current carousel position (e.g., bar code positions 1-80). If an article in bin 60 is desired and the carousel 304 is currently at position 01, it can be determined that the carousel 304 must be rotated (in reverse)

by two apertures. Similarly, if an article in bin 60 is desired and the carousel 304 is currently in position 59, it can be determined that the carousel 304 must be rotated (in forward) by 20 apertures.

Once the desired movement is determined, the motor 308 is then activated at fast speed until the desired position is within one aperture, at which time the motor 308 is switched to a slow speed to attain the final position. After movement of carousel 304 is terminated, the control computer 307 instructs the bar code scanner 380 to read the bar code currently aligned with the scanner 380 to verify that the correct position was attained. If the correct position was not attained, the control computer 307 records the positioning error (for use as a diagnostic) and the positioning sequence is repeated. Whenever the carousel 304 is in motion, the control computer 307 continuously monitors for a locked rotor condition through locked rotor detector 374.

Figure 4A:
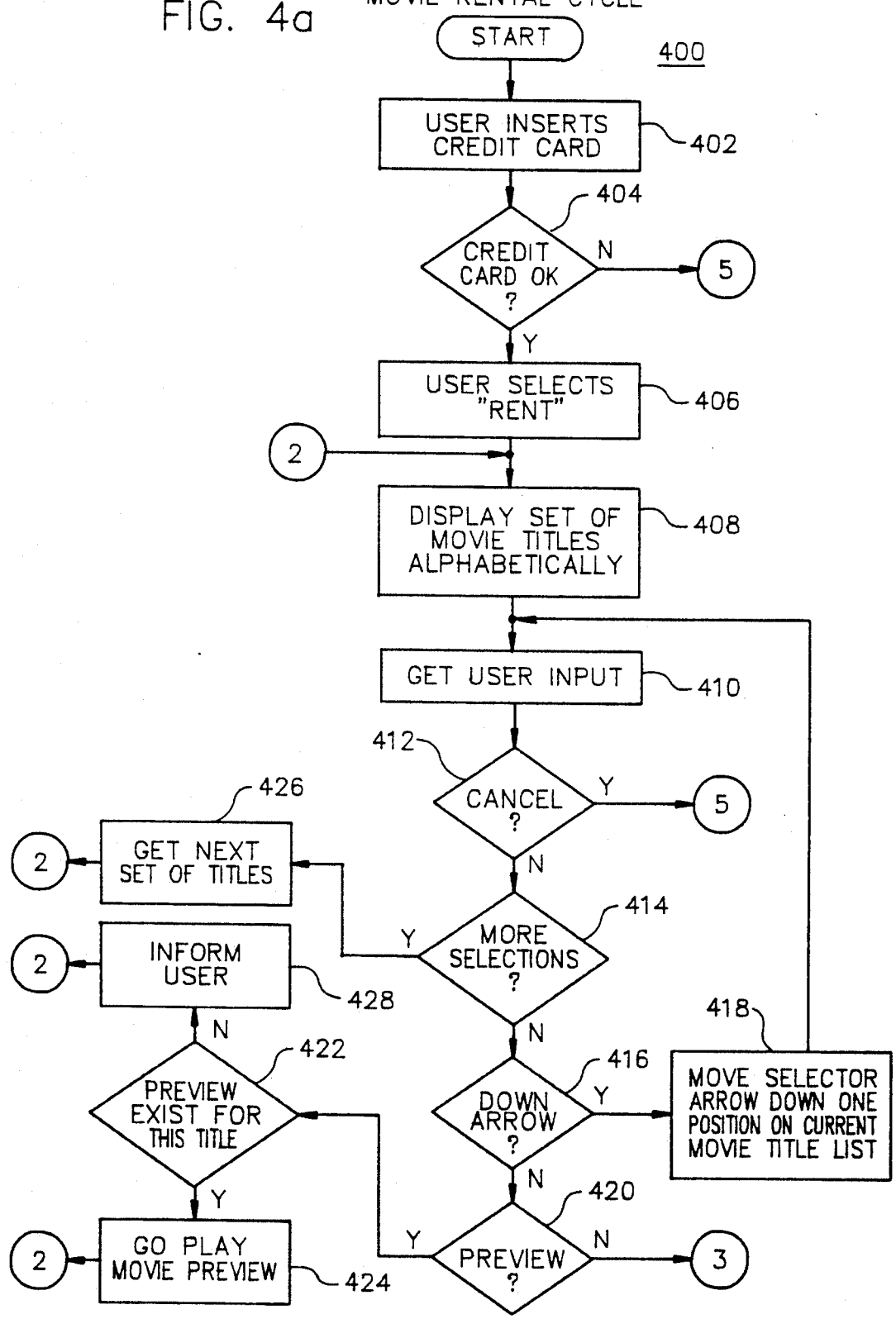
FIGS. 4A–4C are a series of flow diagrams showing the overall operation of the vending machine network of the present invention during a typical article rental cycle.
Figure 4B:
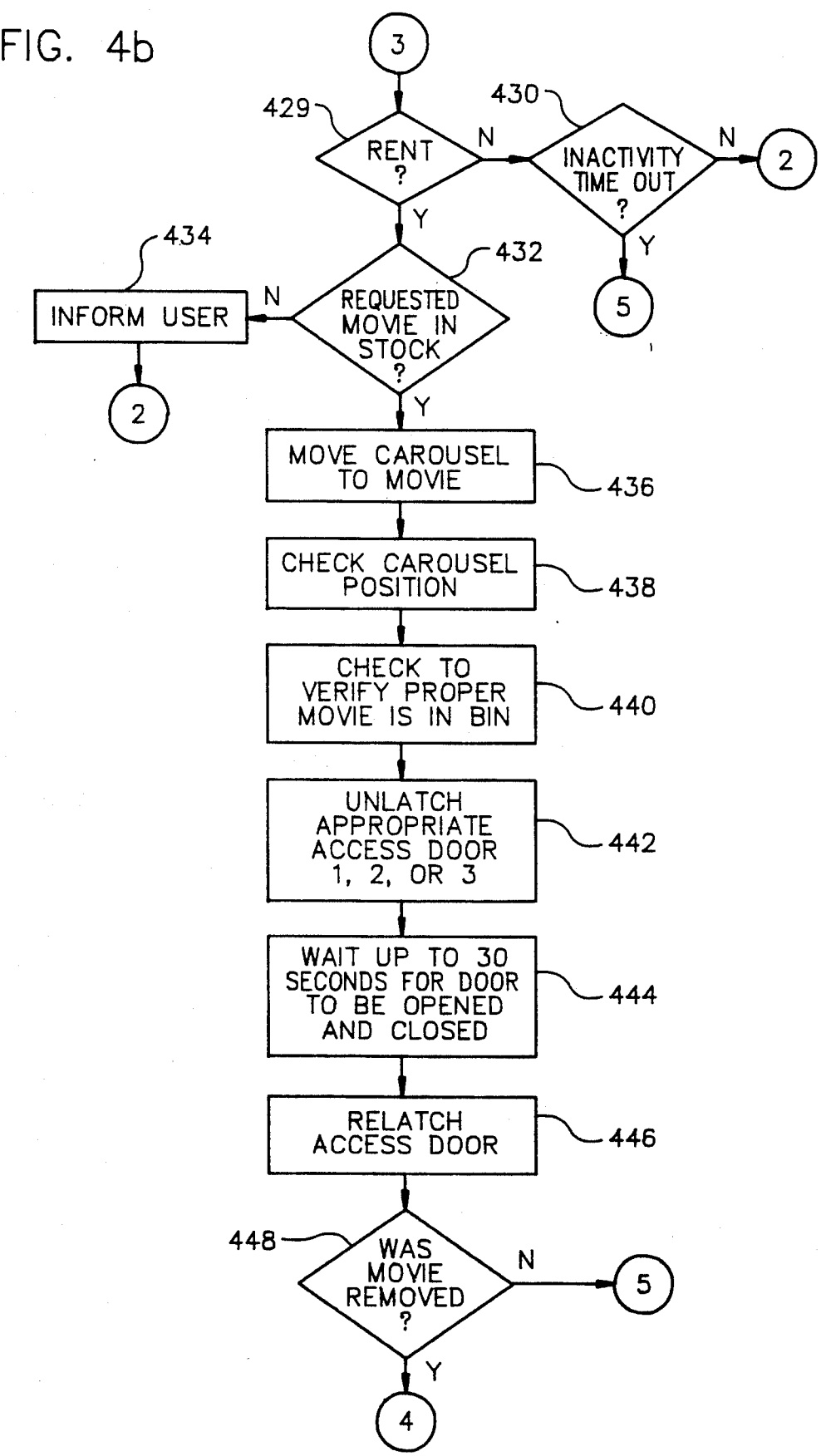
Figure 4C:
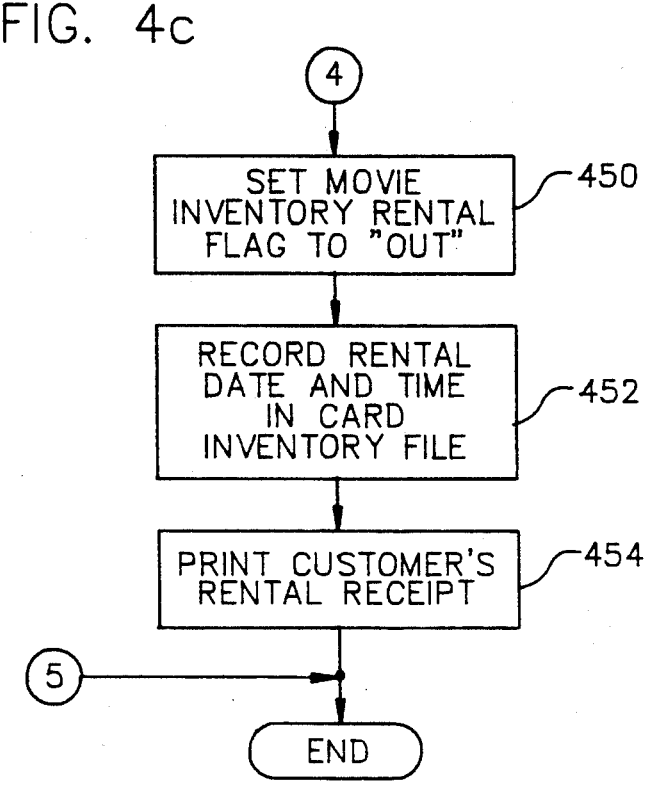

Referring now to FIGS. 4A-4C, the routine 400 describes the operation of the respective vending machines 104-109 during a normal rental cycle. Item 402 is invoked whenever a user inserts a credit card in the vending machine. Decision 404 then determines whether the inserted card is valid. If not, the routine returns. Otherwise, control passes to item 406 when a user selects the "RENT" option with user actuated inputs 320. The vending machine then displays a list of articles available for rent (e.g., a list of available movie titles, etc.) in item 408. Item 410 then gets the user's selection. Decision 412 detects whether the user input is "CANCEL." If so, the routine returns. Otherwise, decision 414 determines whether the user has requested the next set of titles. If so, item 426 gets the next set of titles and control returns to item 408. If the result of decision 414 is negative, decision 416 and 418 move a display cursor in accordance with user inputs 320. Once the user has selected an item, decision 420 determines whether the user has requested a preview for the selected title.

As will be discussed in more detail below, each of the vending machines in system 100 includes a video display 324 and a random access video source, such as a videodisk system which is controlled by routine 400. If in decision 420, the user requests a preview, decision 422 determines whether a preview exists for the requested item. If not, item 428 generates an appropriate message on the vending machine display 324 and control passes to item 408. If a preview is available, item 424 plays the requested preview and control returns to item 408.

If in decision 420, the user does not request a preview, control passes to decision 429 which determines whether the user indicates he wishes to rent the selected article. Decision 430 determines whether the appropriate user input is received within a predetermined time limit. If not, the routine returns. Otherwise, control loops back to item 408 until a user input is received. If the user indicates he wishes to rent the selected item, control passes to decision 432 which determines whether the requested article is in stock. If not, item 434 displays an appropriate message to the user. Control then returns to item 408. If the requested item is in stock, item 436 instructs the position system 350 to move the carousel 304 to the appropriate position which is confirmed by item 438. Item 440 then checks to verify that the requested item is in the predetermined bin position and item 442 unlatches the appropriate access doors 314-318 so the requested article may be removed from the vending machine. After a predetermined delay, items 444 and 446 close and relatch the access doors 314-318. Decision 448 then determines whether the requested article was removed from the vending machine. If not, the routine returns. If so, item 450 sets an internal flag to indicate the article has been removed from inventory and the vending machine inventory records are updated by item 452. Item 454 then prints a customer receipt and the routine returns.

Figure 5C:
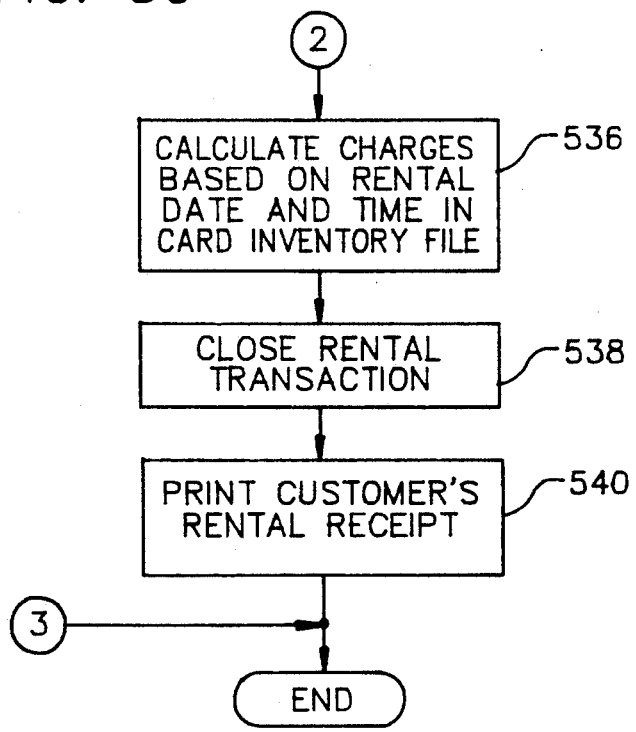
FIGS. 5A–5C are a series of flow diagrams showing the overall operation of the vending machine network of the present invention during a typical article return cycle.
Figure 5A:
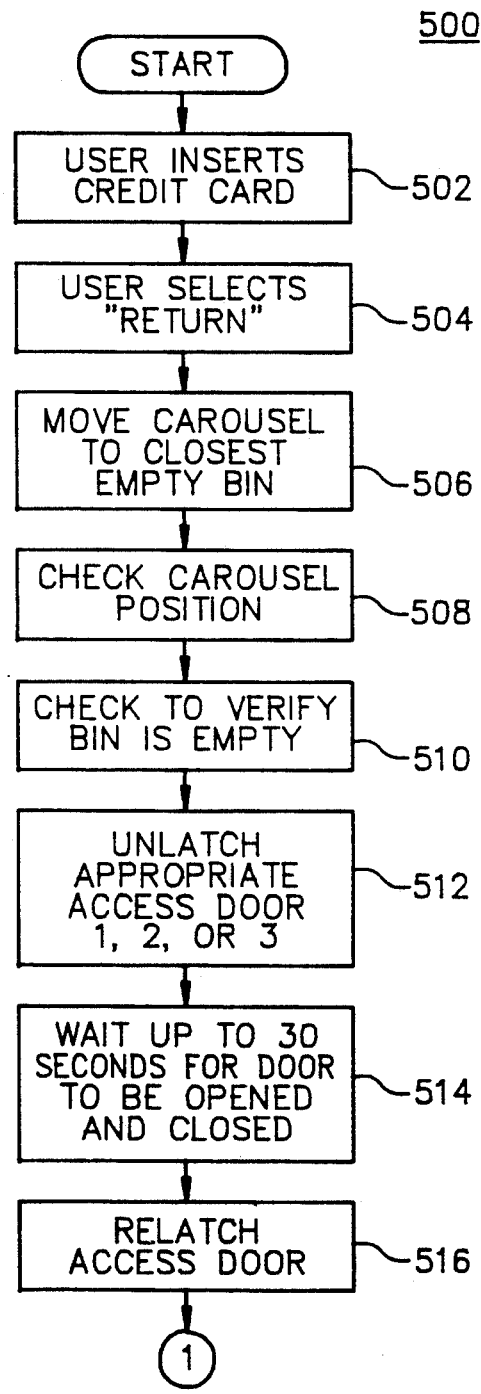
Figure 5B:
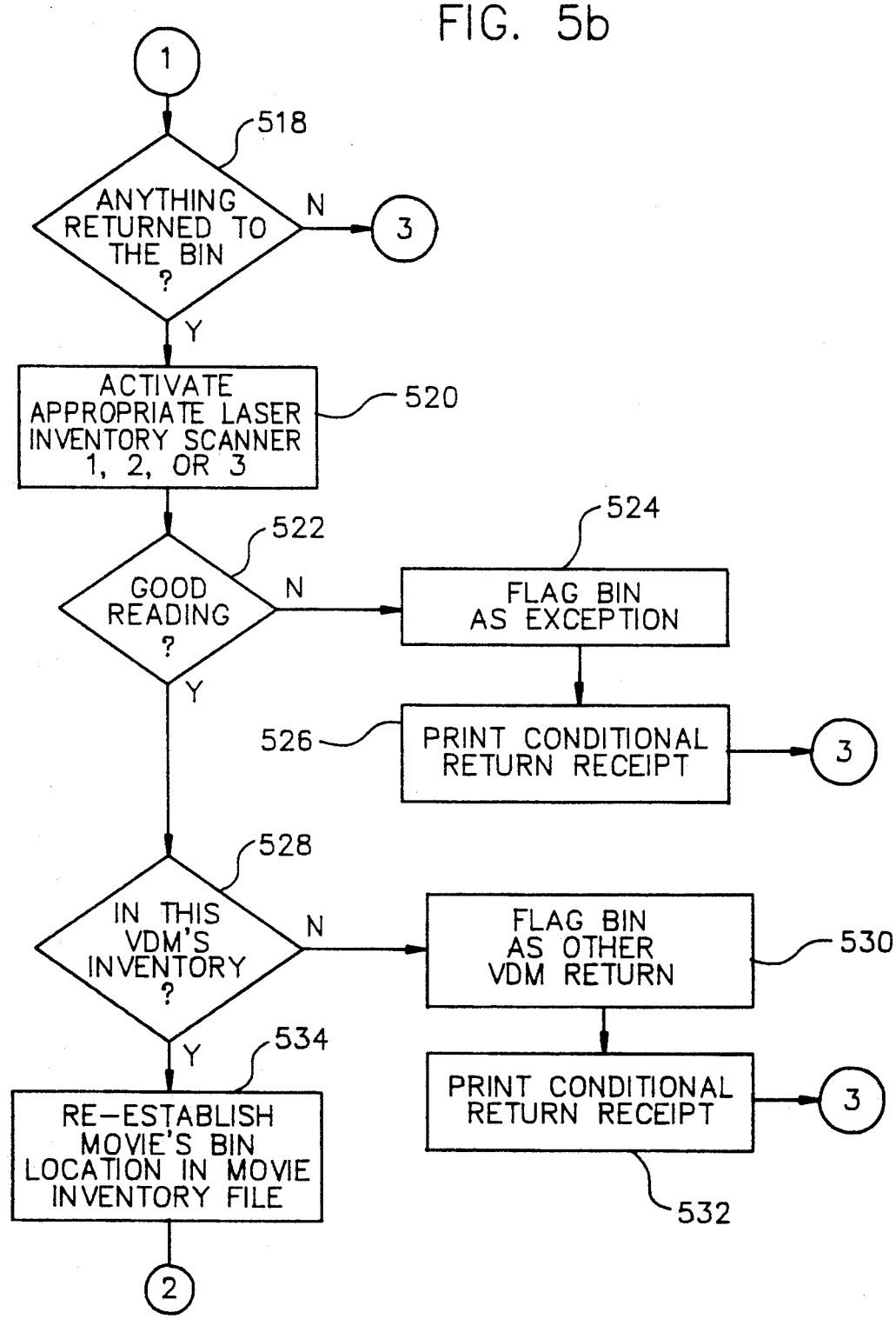

FIGS. 5A-5C describe the operation of the vending machines 104-109 during a typical article return cycle. The return cycle begins when a user inserts his credit card in the vending machine and select "RETURN" as indicated by items 502-504. Item 506 then moves the carousel 304 so the access doors 314-318 are aligned with the next closest empty bin. The carousel position is then verified by item 508. Once item 510 verifies the selected bin is empty, the access doors 314-318 are unlatched by item 512. After a predetermined delay, the access doors are closed and relatched by items 514 and 516. Decision 518 then determines whether an article was returned to the selected bin. If not, the routine returns. Otherwise, the article identification number is read by item 520. Decision 522 then determines whether the article identification was correctly read. If not, item 524 sets an internal flag to indicate the article cannot be identified and item 526 prints a conditional return receipt. The routine then returns.

If the article identification number was correctly read, decision 528 determines whether the article is part of the regular vending machine inventory. If not, item 530 sets an internal flag to indicate that the article is an inventory item from another machine and item 532 prints a conditional return receipt. The routine then returns. If the article is from the vending machine's regular inventory, item 534 records the article's position in the carousel 304 in the article inventory file. Item 536 then calculates the customer charges and records them in a transaction file. Item 538 then closes the rental transaction and item 540 prints a customer receipt. The routine then returns.

Figure 6:
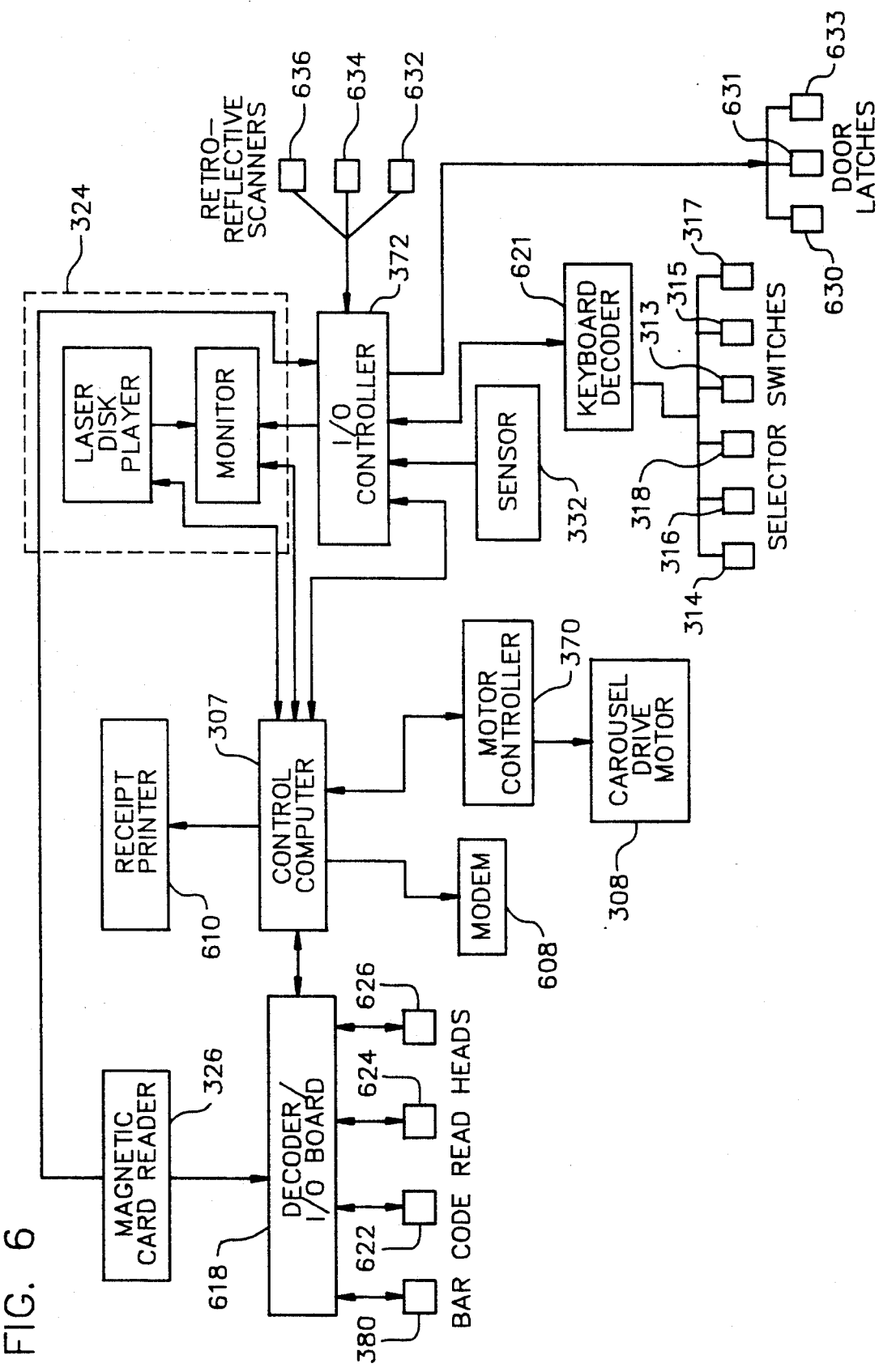
FIG. 6 is a block diagram of the components of the vending machine described in conjunction with FIG. 3A.

Referring now to FIG. 6, a block diagram of an exemplary vending machine is shown. The operation of a vending machine is controlled by control computer 307. The control computer 307 controls the position of carousel 304 through motor controller 370 and motor 308. Communication with control processing system 110 is provided through modem 608, operating in conjunction with any of a number of well-known communication software packages. Customer receipts are printed with printer 610. The control computer 307 is coupled to preview system 324 through I/O controller 372. I/O controller 372 is further coupled to selector switches 313-318, through keyboard decoder 621, which are used to select articles; to door latches 630, 631 and 633, which lock the access doors 314-318; and to retroreflective scanners 632, 634 and 636, which detect whether articles are in respective slots. Door latches 630, 631 and 633 may preferably be of the conventional solenoid actuated type, configured to lock the access doors 314-318 when in a resting state. In addition, control computer 307 cooperates with decoder-I/O board 618 to control magnetic card reader 326 and bar code read heads 380, 622-626.

Figure 7:
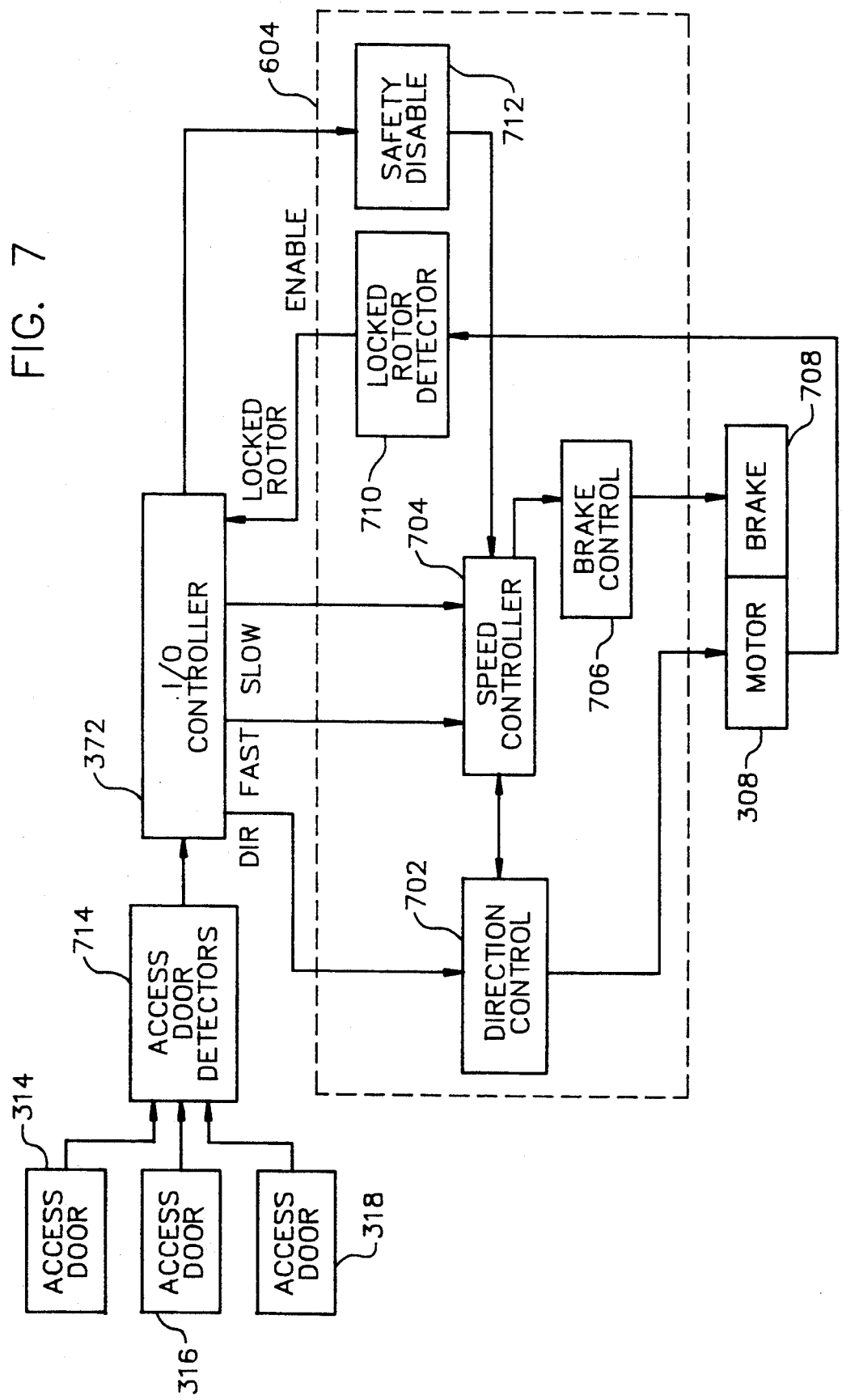
FIG. 7 is a diagram of the circuitry used to position the carousel of the vending machine described in conjunction with FIG. 3A.

Referring now to FIG. 7, the motor controller 604 comprises a number of conventional circuits which may be implemented in a number of ways. The direction controller 702 is responsive to the direction control signal generated by I/O controller 372, and it controls the polarity of the voltage across motor 308. The speed controller 704 may be constructed of conventional circuitry, which is a response to the fast and slow control signals generated by I/O controller 372, and it generates a variable D.C. voltage which is based on the currently selected mode of operation. In the preferred practice of the present invention, speed controller 704 generates 90 volts in the fast mode, 60 volts in the slow mode and 0 volts if neither mode is selected, although the actual voltages may vary depending on the specific D.C. motor 308 used with the system. A brake control 706 is coupled between speed controller 704 and brake 708 to effect a braking signal whenever a fast or slow motor control signal is absent. Brake 708 is responsive to the braking signal and it comprises a well known device which clamps the rotor of motor 308 whenever the braking signal is actuated. Locked rotor detector 710, coupled between motor 308 and I/O controller 372, monitors the amount of current consumed by motor 308 to detect a locked rotor condition (which is indicated by an excessive amount of current consumed by motor 308). If such a condition is detected, the motor 308 is disabled by safety disable 712. Similarly, access door detectors 714, coupled to access doors 314-318, detect when an access door is open. When such a condition is detected, the safety disable circuit 712 disables motor 308.

Figure 8:
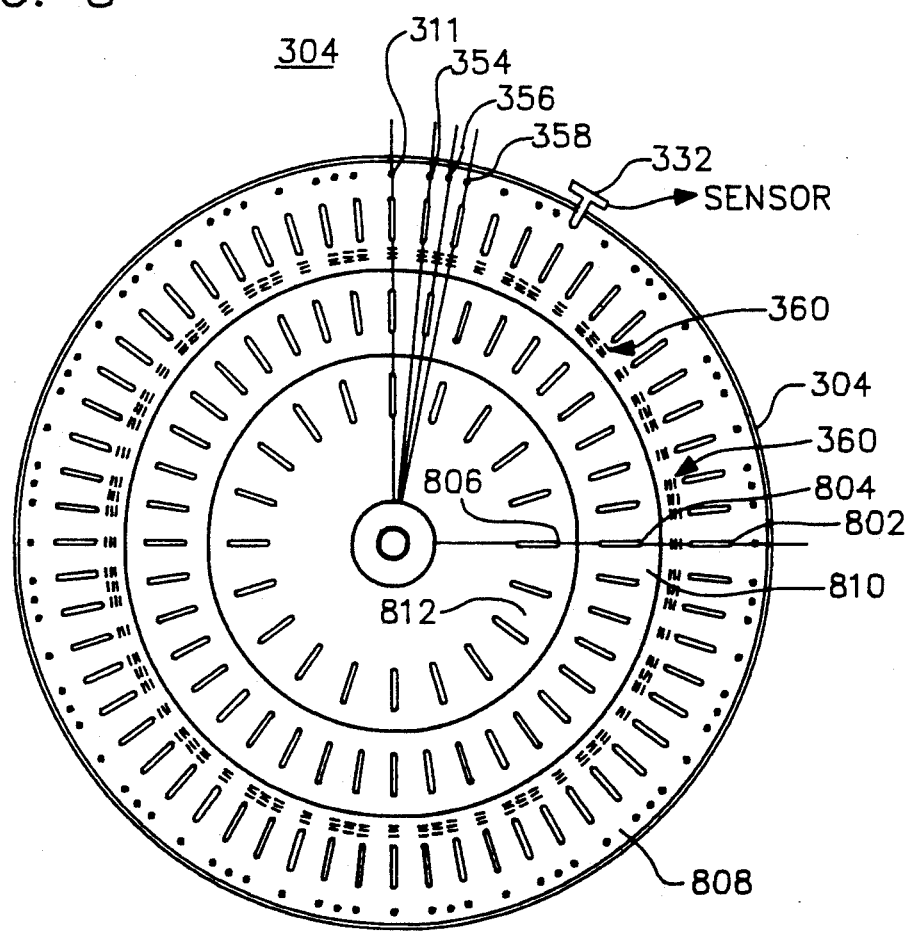
FIG. 8 is a rear view of the carousel of the vending machine of FIG. 3A.

Referring now to FIG. 8, the rear face of carousel 304 is shown. In the preferred practice of the present invention, in the rear face of carousel 304, apertures (e.g. apertures 802, 804, 806) are disposed in a position coinciding with the position of each of the respective bins of carousel 304 so that the contents of the respective bins are visible through the apertures. As noted above, the respective bins are arranged in a plurality of concentric rings 808-812 with respective compartments within each ring being spaced equidistant from each other.

Figure 9:
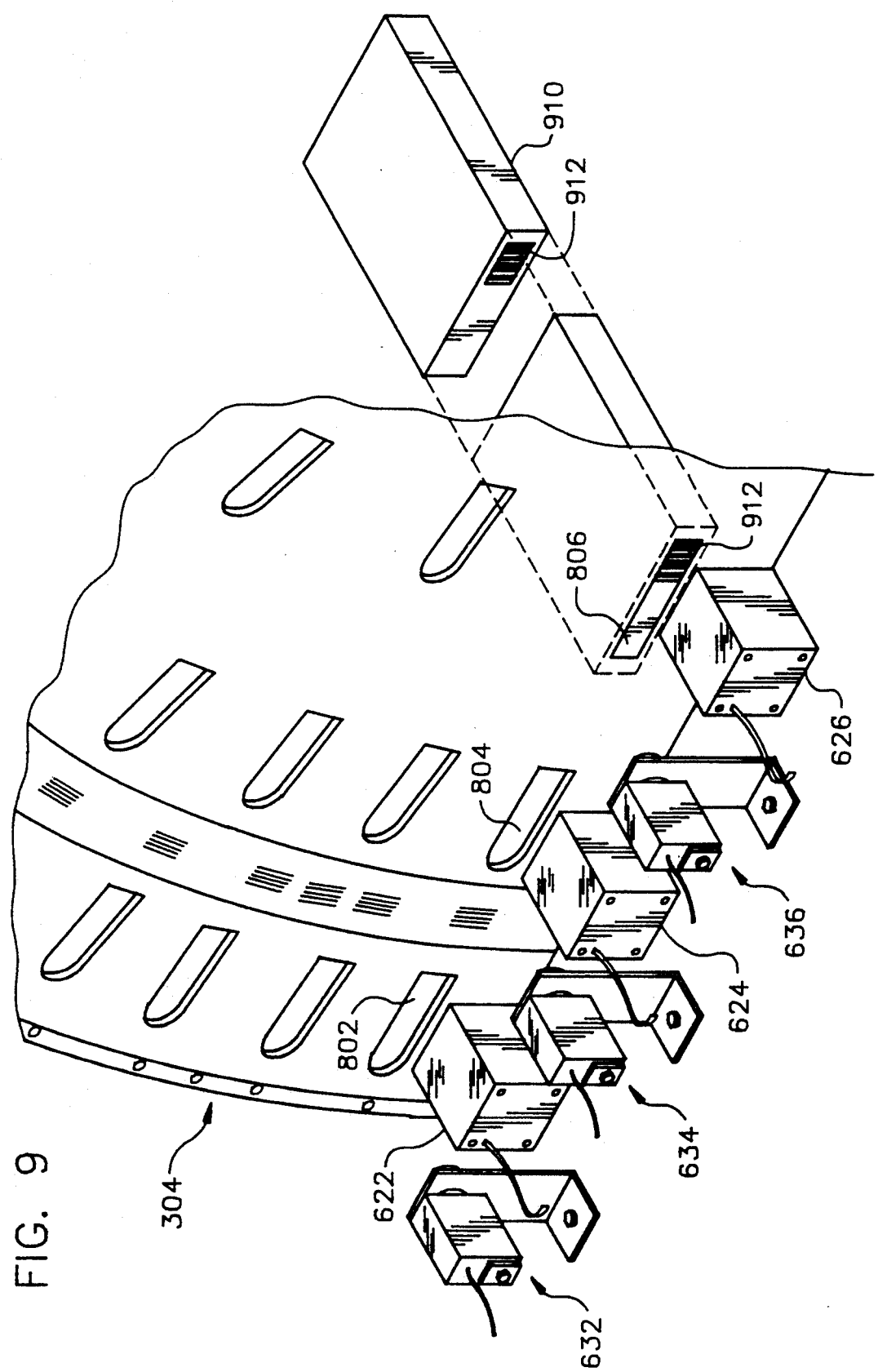
FIG. 9 is a rear view in perspective of bar code scanners used to identify items stored in the carousel of the vending machine of FIG. 3A.

FIG. 9 is a rear view in perspective of a plurality of bar code scanners 622-626 aligned with apertures on the rear face of carousel 304. As noted above, as an article (e.g., article 910) is loaded in the carousel 304, it is visible through an associated aperture (e.g., apertures 802, 804, 806). Each article is encoded with a bar code 912 which may be scanned by an associated bar code scanner 622-626. Whenever a bar code is scanned, it is coupled to control computer 307 from bar code scanner heads 622-626 through bar code decoder 618. In addition, retroreflective scan heads 632-636 are used to detect whether items are present in a particular bin if a bar code cannot be detected.

Figure 10:
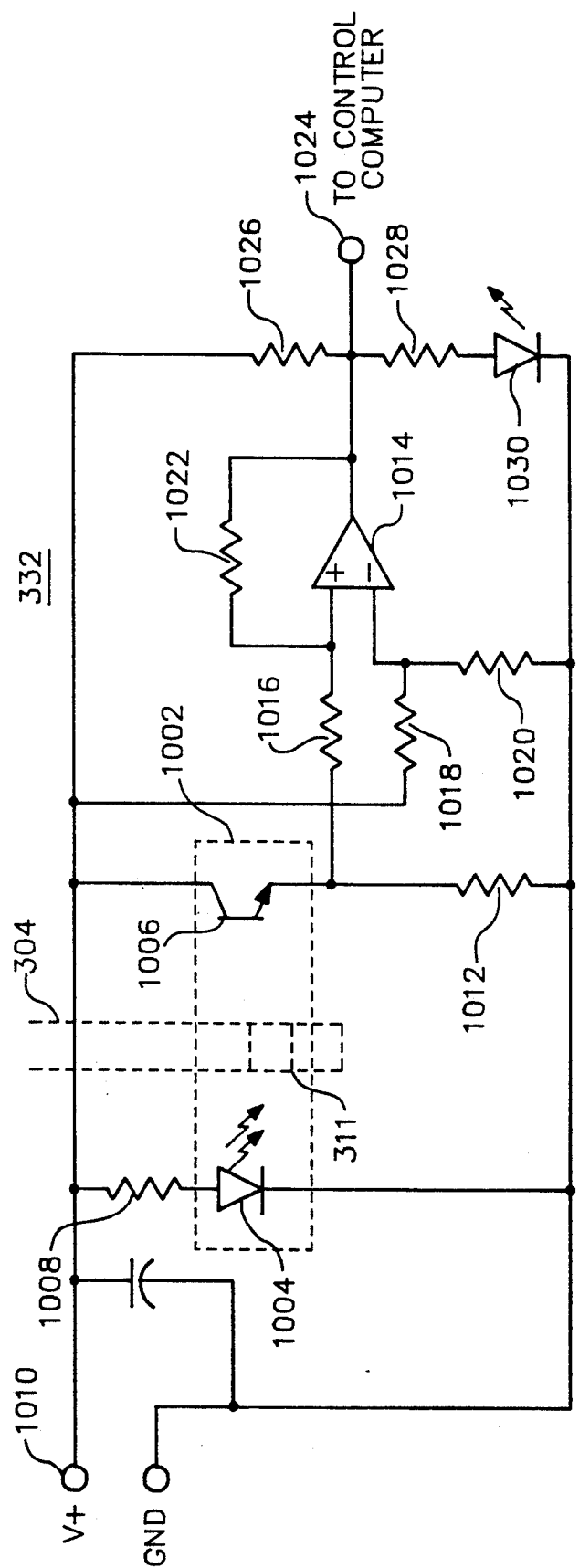
FIG. 10 is a schematic diagram of the aperture sensing means of the vending machine of FIG. 3A.

Referring now to FIG. 10, the sensor 332 comprises an emitter/detector 1002 comprising laser diode 1004 and detector 1006. Resistor 1008, coupled between laser diode 1004 and a V+ power supply input 1010, provides power to laser diode 1004. Laser diode 1004 and detector 1006 are disposed on either side of carousel 304 aligned with the respective apertures disposed about the circumference of carousel 304 so that the light generated by laser diode 1004 travels through the apertures (e.g. aperture 311) to activate detector 1006. When detector 1006 is activated, current flows from the V+ power supply terminal 1010 into resistor 1012, thus generating a positive voltage across resistor 1012 which is coupled through resistor 1016 to the noninverting input of buffer amplifier 1014. A reference voltage for buffer amplifier 1014 is provided by a voltage divider formed by resistors 1018 and 1020. The gain of buffer amplifier 1014 is controlled by resistor 1022. The output of buffer amplifier 1014 is coupled to control computer 307 through output terminal 1024. Pull-up resistor 1026 is disposed between output terminal 1024 and V+ input terminal 1010. Resistor 1028 and LED 1030 provide an indicator light for aperture detection.

Figure 12:
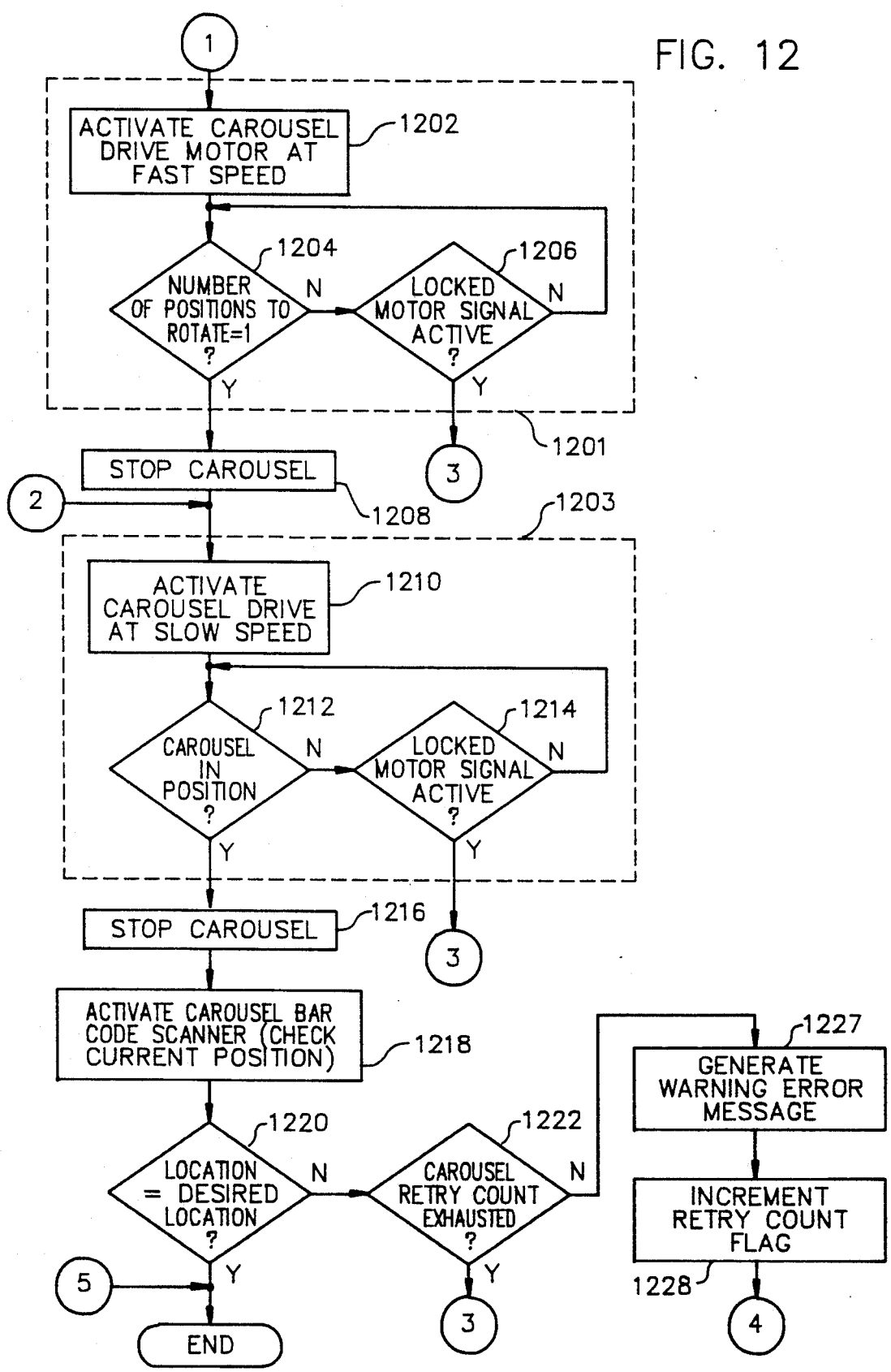
FIG. 12 is a continuation of the flow diagram of FIG. 11.

Referring now to FIGS. 11-12, the detailed operation of the control computer 307 is shown. When the carousel positioning routine 1100 is invoked, item 1101 initializes a recount counter. Item 1102 and decision 1104 then read the output of sensor 332 to determine whether the carousel 304 is in a valid position. A valid position is defined as a position wherein the sensor 332 is aligned with an aperture e.g., apertures 354-358). If the carousel 304 is not in a valid position, item 1106 activates the carousel drive motor 308 in the slow speed. While the carousel 304 is moving, decision 1108 monitors the rotor locked signal to ensure the drive motor 308 is not locked. Assuming the drive motor 308 is not locked, control passes to decision 1104 until the carousel position is initialized. Once the carousel position is initialized, item 1110 activates the bar code scanner 380 to read the current position of the carousel 304. Item 1112 then calculates the number of positions and direction to rotate the carousel 304 based on the current and the desired position.

As noted above, the present invention contemplates the use of a carousel 304 having compartments for storing and dispensing articles. The respective compartments are arranged in offset concentric rings 808-812 wherein the outer ring 808 has 60 compartments, the middle ring 810 has 40 compartments and the inner ring 812 has 20 compartments. In the preferred practice of the present invention, 80 apertures are used to encode the position of all 120 compartments. As mentioned above, a mapping table 352 is used to map the 80 aperture positions to physical compartments. This mapping table is used by item 1112 when calculating the number of positions in which to rotate the carousel 304 to a desired position. In other words, each compartment in any of the three rings may be used to store a unique article. Each compartment may be identified by a unique bar code and by its ring number, e.g., ring 808, 810 or 812. The mapping table 352 is used to correlate the location of each unique compartment with its corresponding bar code/aperture as well as its ring number location.

Once a desired position for carousel 304 is calculated by looking up the desired position in the mapping table 352 and calculating an offset from the current carousel position, decision 1114 determines whether the carousel is already in the desired position. If so, the routine returns. Otherwise, decision 1116 determines whether the carousel is within one aperture of a desired position. If so, the routine enters slow speed loop 1203. If not, the system 350 enters fast speed loop 1201 wherein item 1202 starts moving the carousel 304 at fast speed, while decision 1206 monitors the drive motor 308 for a locked condition. Decision 1204 determines whether the carousel 304 is within one aperture of the desired position. If so, item 1208 stops the carousel 304 and the routine enters slow speed loop 1203 wherein item 1210 activates the carousel 304 at slow speed. Decision 1212 then monitors the carousel 304 to determine when it is in the position corresponding to the next aperture, while decision 1214 monitors the drive motor 304 for a locked condition. If decision 1108, 1206 or 1214 detect a locked rotor condition, control passes to item 1224 which shuts down the system while item 1226 generates an error message and the routine returns.

Once the carousel 304 is in the calculated position, the carousel 304 stops in item 1216, and item 1218 activates the bar code scanner 380 to read the bar code of the current carousel position. Decision 1220 then determines whether the current position is the same as the desired location. If not, control passes to decision 1222 which determines if the retry count has reached a predetermined maximum value. If so, control passes to items 1224 and 1226 and the routine returns. Otherwise, item 1227 generates a warning message and item 1228 increments the recount flag. Control then returns to item 1102 to repeat the procedure until the correct position is found or until the recount is exhausted, indicating a system failure.

Figure 13B:
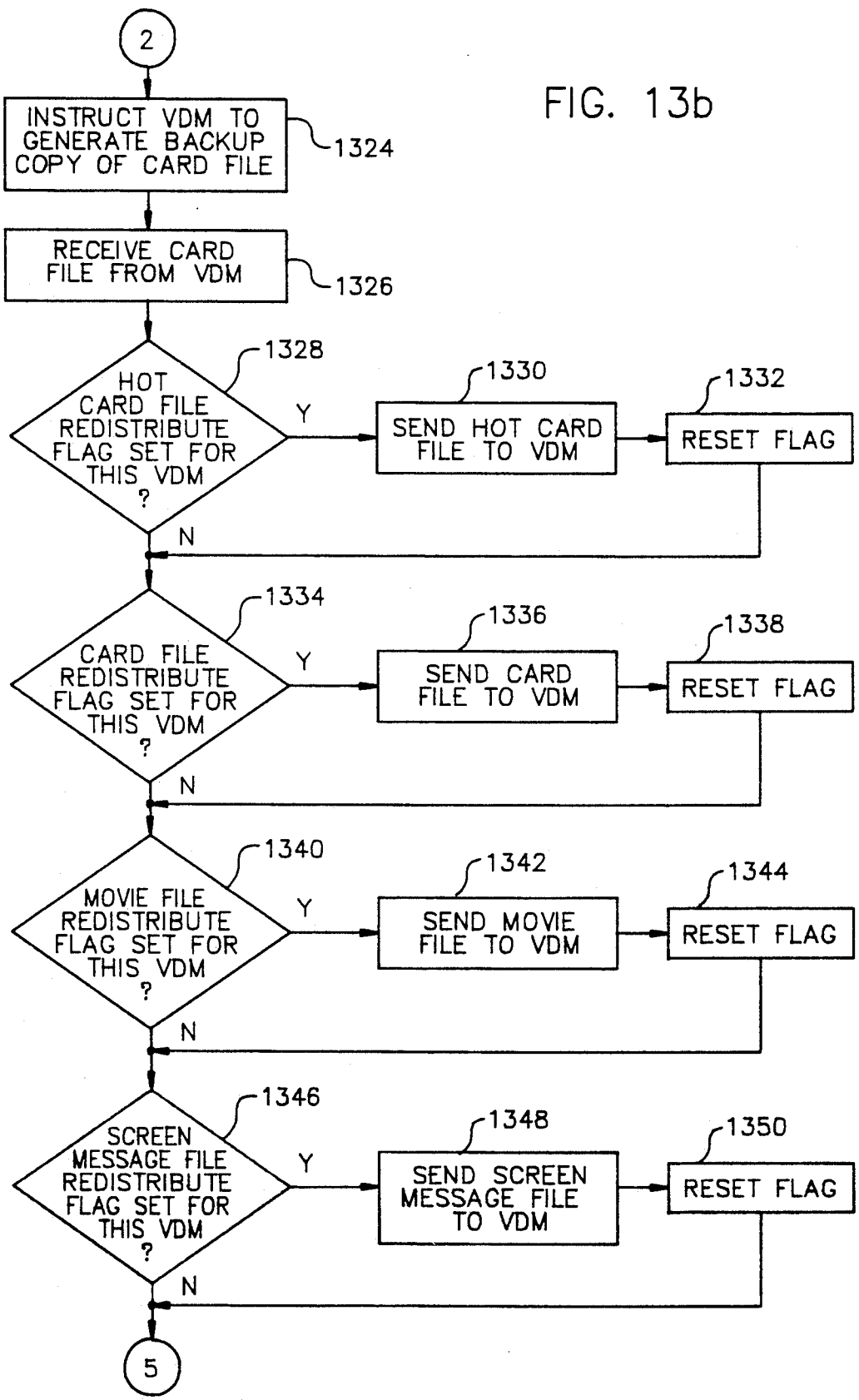
Figure 13C:
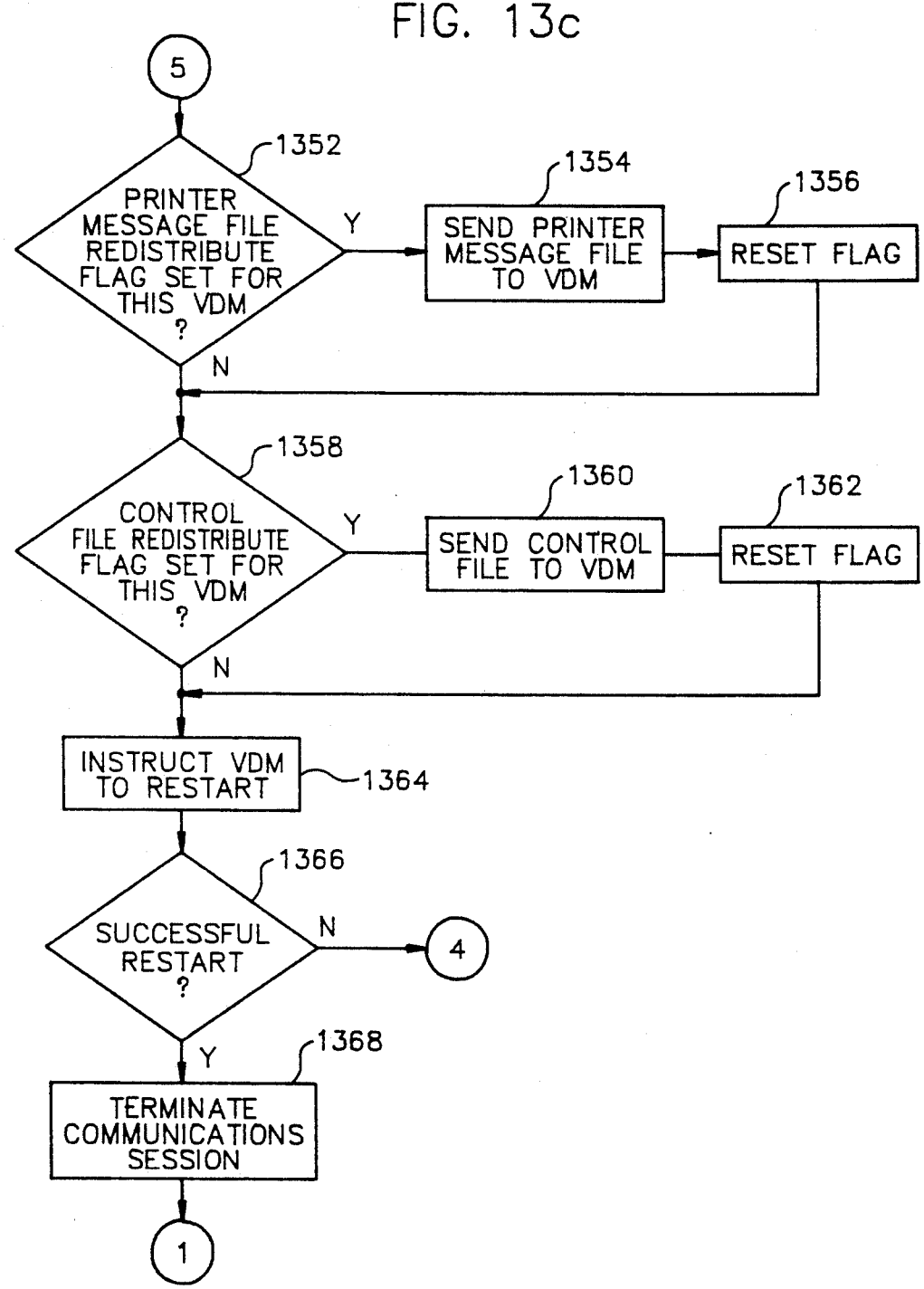

Referring now to FIGS. 13A–13C, the routine 1300 comprises the host communication system 206 of FIG. 2. In the system 100 each of the respective vending machines maintains a plurality of files which may be accessed or modified during the operation of the machine. For example, a credit/debit card file is used to store customer billing information. A hot card file is used to maintain a list of invalid credit card numbers. A movie inventory file is used to maintain a list of movie titles and other pertinent information for articles currently in the particular vending machine's inventory. A screen message file contains a list of messages which may be displayed to a user. A printer message file contains a list of messages which may be printed on receipts issued to a user and a control file is used to store configuration parameters such as tax rates, callback modem phone numbers, store location, etc. The routine 1300 is invoked to retrieve transaction information from the dispensing machines and to transmit files to the dispensing machines. When invoked, item 1302 loads the machine dialing directory. 1304 determines whether the dialing function is completed for all machines in the system. In operation, each machine in the system is dialed sequentially until every machine in the system has been called. If all machines have been dialed, the routine returns. Otherwise, control passes to item 1306 to dial the next machine. Decision 1308 determines whether the machine of interest answers. In item 1310, a hard copy exception message is printed to indicate the machine did not answer. Control then passes to decision 1304. If the machine answers, the host 110 terminates the call and waits for the machine of interest to return the call in item 1312. Decision 1314 determines whether the machine calls back. If not, control passes to item 1310 wherein item 1310 is passed the appropriate text message to indicate the machine did not call back. Otherwise, control passes to item 1316, which instructs the machine to generate a back-up copy of its transaction types. Item 1318 instructs the machine to transmit its transaction data. The definition of transaction data types and data formats is set forth in Appendix 1. In the preferred practice of the present invention, each transaction is recorded in a sequential ASCII flat data file. An example of actual transaction data is set forth in Appendix 2.

Once the transaction data is transmitted to the host, control passes to item 1320 wherein the host instructs the machine to delete its transaction data. Control passes to decision 1322 wherein the host 110 parses the transaction data based on transaction type. In item 1324, the machine is instructed to generate a back-up copy of its card file. This file is a temporary file which is used to track pending card information. For example, card numbers for items currently being rented are stored in this file. The card file is an indexed sequential access method (ISAM) type file having entries of the format shown in Appendix 3.

Item 1326 then instructs the machine to send its card file to provide for the cross return of tapes in different machines in the system.

The present invention contemplates the use of a variety of flags which indicate the state of each machine in the system. For example, a hot-card file redistribute flag is used to indicate a new card has been added to the hot-card file and this card number is to be transmitted to the particular machine. A card file flag is used to indicate a particular card is to be deleted from the card file of a particular machine. A movie file flag is used to update a machine's master movie file. A screen file flag is used to update a machine screen message file. A printer message file is used update a machine's printer message. A control file flag is set to update certain control file information such as call-back phone numbers, etc.

Decision 1328 determines whether the hot-card redistribute flag is set for the particular machine. If not, control passes to decision 1334. Otherwise, item 1330 sends the updated hot-card file to the machine. Control then passes to item 1332 to reset the flag. Decision 1334 determines whether the card file redistribute flag is set for the particular machine. If not, control passes to decision 1340. Otherwise, item 1336 sends the card file to the machine. Control then passes to item 1338 to reset the flag. Decision 1340 determines whether the movie file redistribute flag is set for the particular machine. If not, control passes to decision 1346. Otherwise, item 1342 sends the movie file to the machine. Control then passes to item 1344 to reset the flag. Decision 1346 determines whether the screen message file redistribute flag is set for the machine. If not, control passes to decision 1352. Otherwise, item 1348 sends a new screen message file to the machine. Control then passes to item 1350 to reset the flag. Decision 1352 determines whether the printer message redistribute flag is set for the machine. If not, control passes to decision 1358. Otherwise, item 1354 sends the printer message file to the machine. Item 1356 then resets the flag. Decision 1358 determines whether the control file redistribute flag is set for the machine. If not, control passes to item 1364. Otherwise, item 1360 sends the control file to the machine and item 1362 resets the flag.

Item 1364 instructs the machine to restart itself since the machine is typically disabled during the above functions. Decision 1366 then determines whether the restart was successful. If not, control returns to item 1310 to generate the appropriate hard copy error message. The communication session is then terminated in item 1368 and the routine returns.

Figure 14:
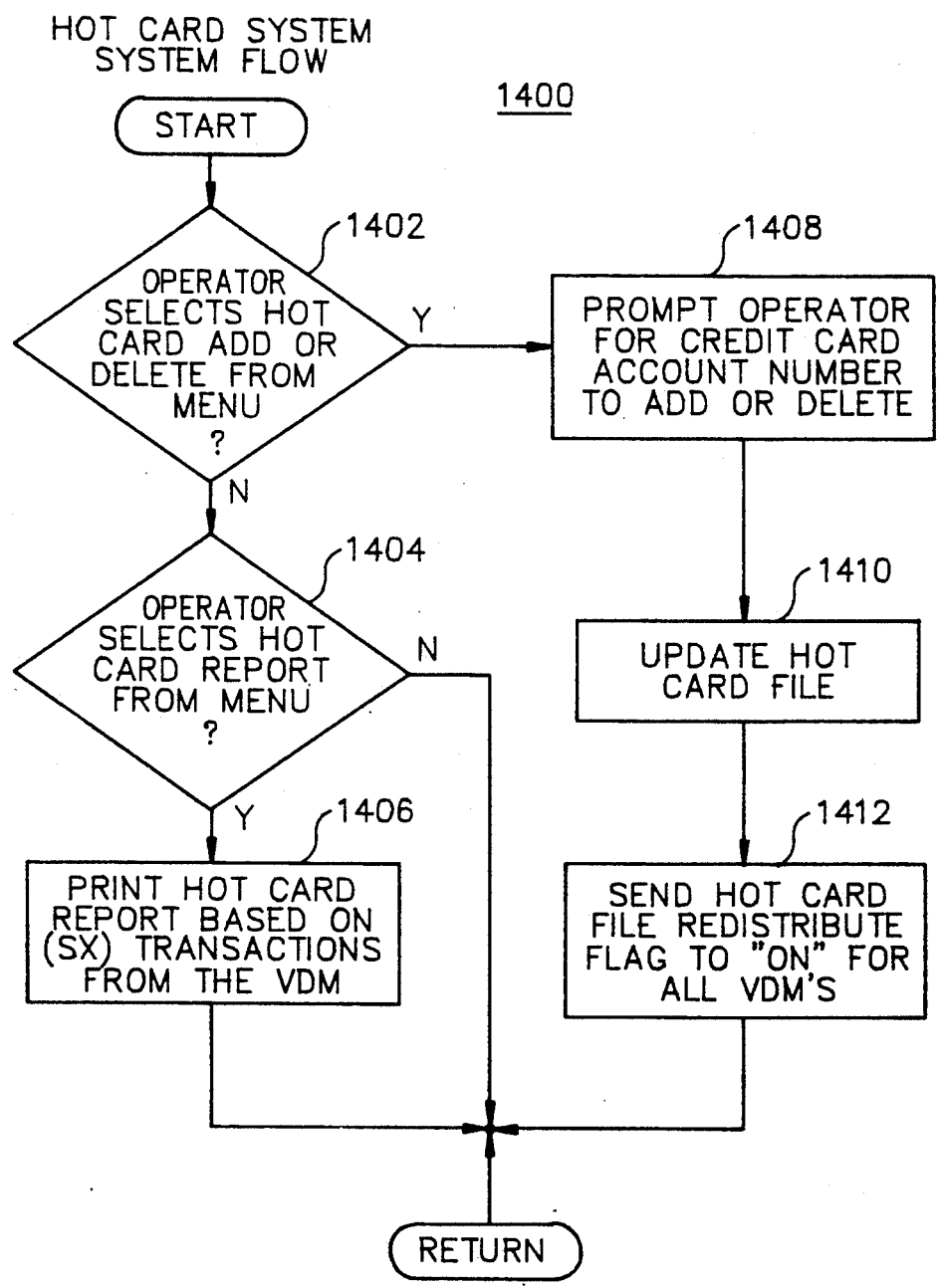
FIG. 14 is a flow diagram of the maintenance procedure for processing a hot-card file.

Referring now to FIG. 14, the routine 1400 is invoked to maintain the hot-card file portion of the hot-card system 212. When invoked, decision 1402 determines whether the system manager wishes to add or delete a card number from the list. If add/delete is selected, control passes to item 1408 which prompts the operator for the card number to add or delete. Item 1410 then updates the ISAM hot-card file (as shown in Appendix 3) accordingly. Subsequently, item 1412 sets the hot-card file redistribute flag to redistribute the hot-card file to every machine in the network. Control then returns.

If the result of decision 1402 is negative, control passes to decision 1404, which determines whether report selection has been requested. If so, control passes to item 1406 to print a hot-card report based on the "SX" transactions recorded in the transaction data. Control then returns.

Figure 15B:
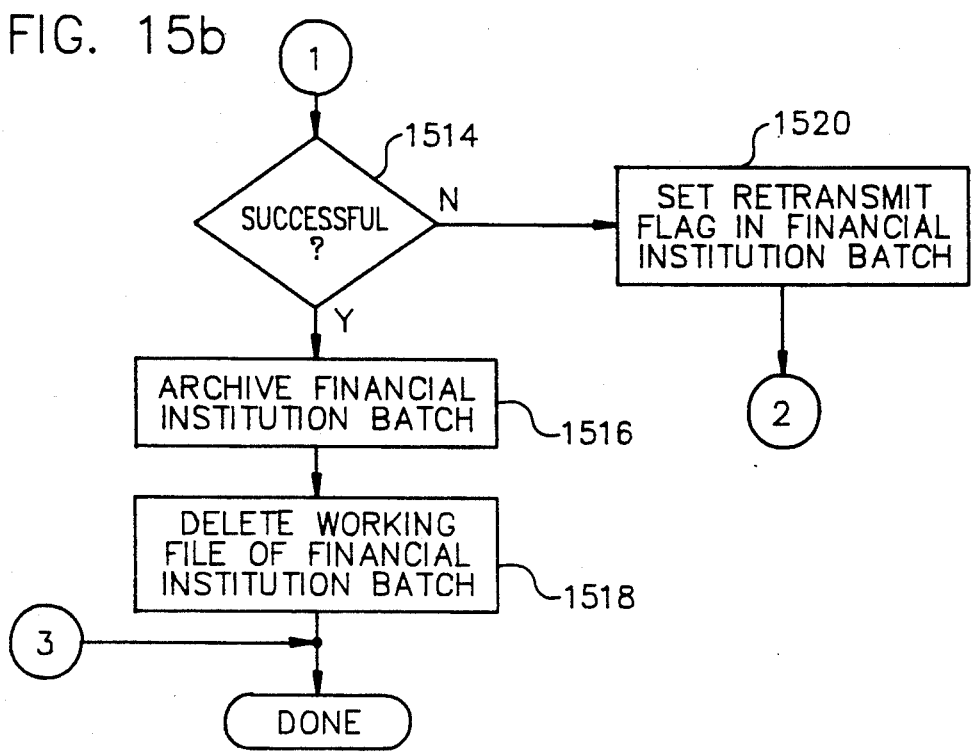

Referring now to FIGS. 15A-15B, the routine 1500 is invoked to submit charges to a financial institution 112 for reimbursement. When invoked, decision 1502 determines whether there are any pending deposits (which are identified by the TI prefix in the transaction file). If there are no pending deposits, the routine returns. Otherwise, item 1504 converts the deposit transaction from the "TI" transaction format to the required financial institution's format which may be specified by ISO Standard Number ISO 8583, Aug. 15, 1987. An example of another format which may be used by a financial institution is set forth in Appendix 5. Item 1506 then calculates batch totals, which are the total number of transactions and total deposit amount. Item 1508 then inserts a batch trailer at the end of the file and Item 1510 inserts a batch header at the beginning of the file wherein the batch header contains static information such as merchant number, etc. Item 1512 then sends the batch to the financial institution 112 via a telecommunications link or causes the generation of a computer tape, etc. Decision 1514 verifies whether the transmission was successful. If so, item 1516 archives the batch, and item 1518 deletes the working batch file. The routine then returns. If the result of decision 1514 was negative, control passes to item 1520 which sets a retransmit flag in the batch to assist in verifying whether the batch has been previously received by the financial institution, and control passes to item 1512.

Figure 16B:
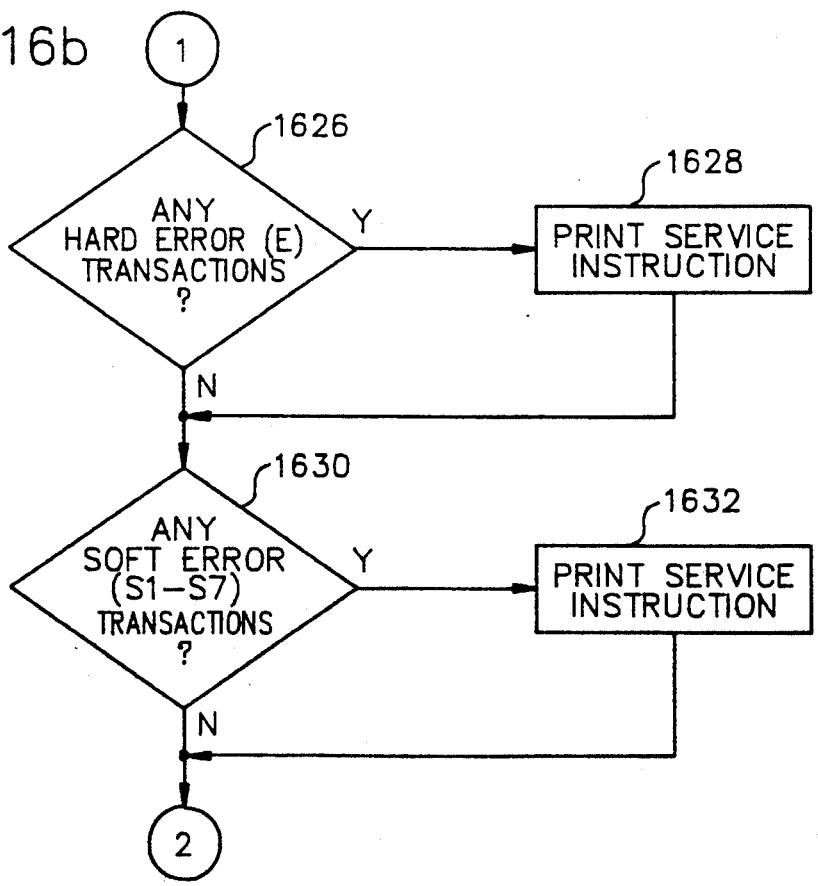
FIGS. 16A-16B are a series of diagrams detailing the process by which dispensing machine exceptions are reported to service personnel.
Figure 16A:
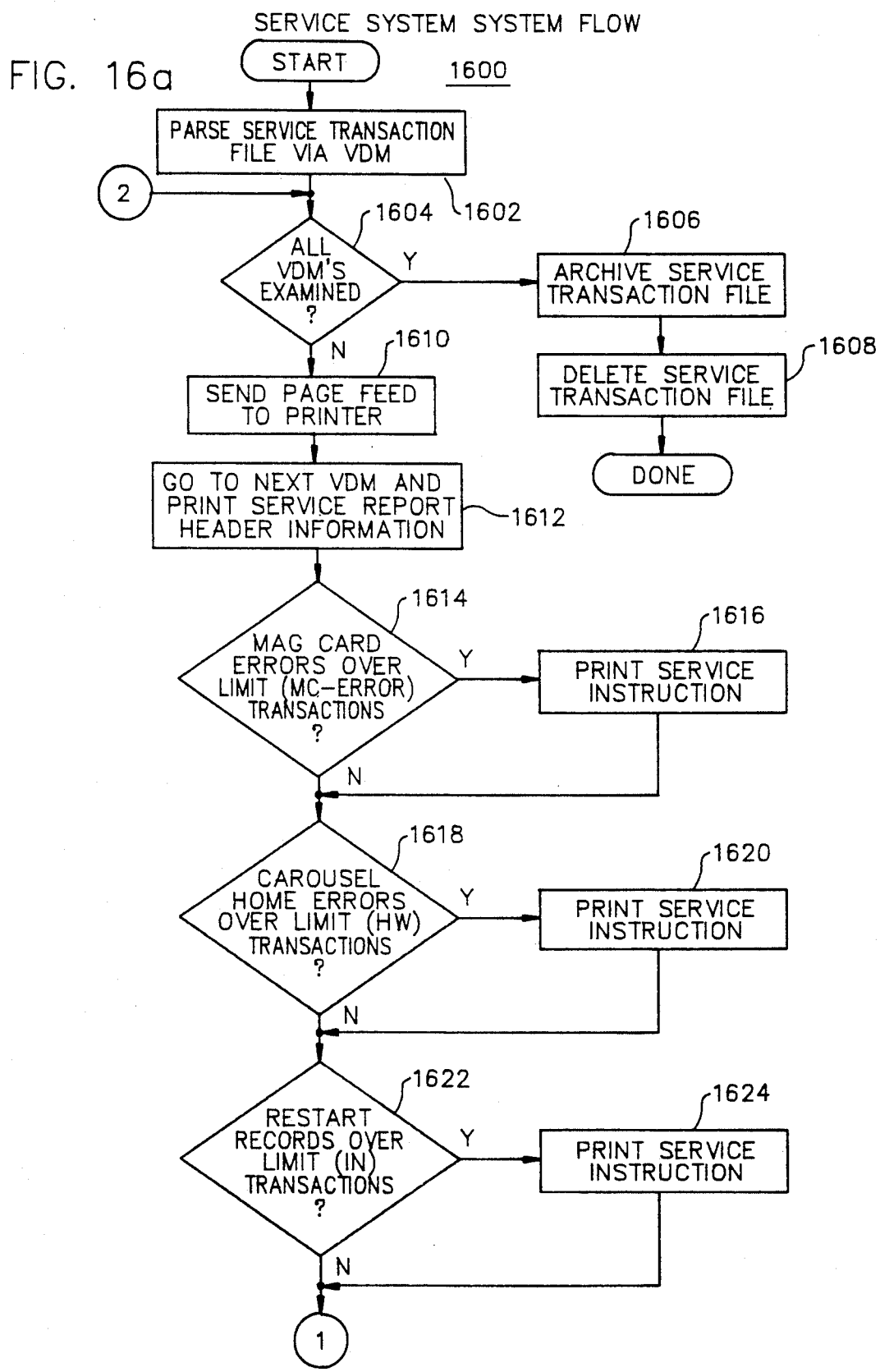

Referring now to FIGS. 16A-16B, the routine 1600 is invoked to generate reports to initiate service requests in the service system 210. When invoked, item 1602 parses service transactions from the machine transaction file by machine to generate a service report specific to each machine. Decision 1604 then determines whether all machines have been processed. If so, the service transaction file is archived by item 1606. The working service request file is then deleted by item 1608 and the routine returns. If the result of decision 1604 is negative, item 1610 sends a form feed command to the system printer so the report for each machine begins at a new page. Control then passes to item 1612 which prints header information such as machine I.D. and address information at the top of the report for that machine. The routine 1600 then tests for five different types of errors (e.g., number of card errors greater than a predefined limit (MC-type); carousel homing errors (HW-type); restart records (IN-type) (initializations); hard errors (E-type); soft errors (S1-S7-type). Specifically, decision 1614 determines whether "MC" type errors are over a predefined limit. If not, control passes to decision 1618. Otherwise, item 1616 prints the appropriate service instruction. Decision 1618 determines whether "HW" type errors are over a predefined limit. If not, control passes to decision 1622. Otherwise, item 1620 prints the appropriate service instruction. Decision 1622 determines whether "IN" type errors are over a predefined limit. If not, control passes to decision 1626. Otherwise, item 1624 prints the appropriate service instruction. Item 1626 determines whether "E" type errors are over a predefined limit. If not, control passes to decision 1630. Otherwise, item 1628 prints a service instruction. Decision 1630 determines whether any "S1-S7" errors occurred in the transaction. If not, control passes to decision 1604. Otherwise, item 1632 prints a service instruction.

Figure 17:
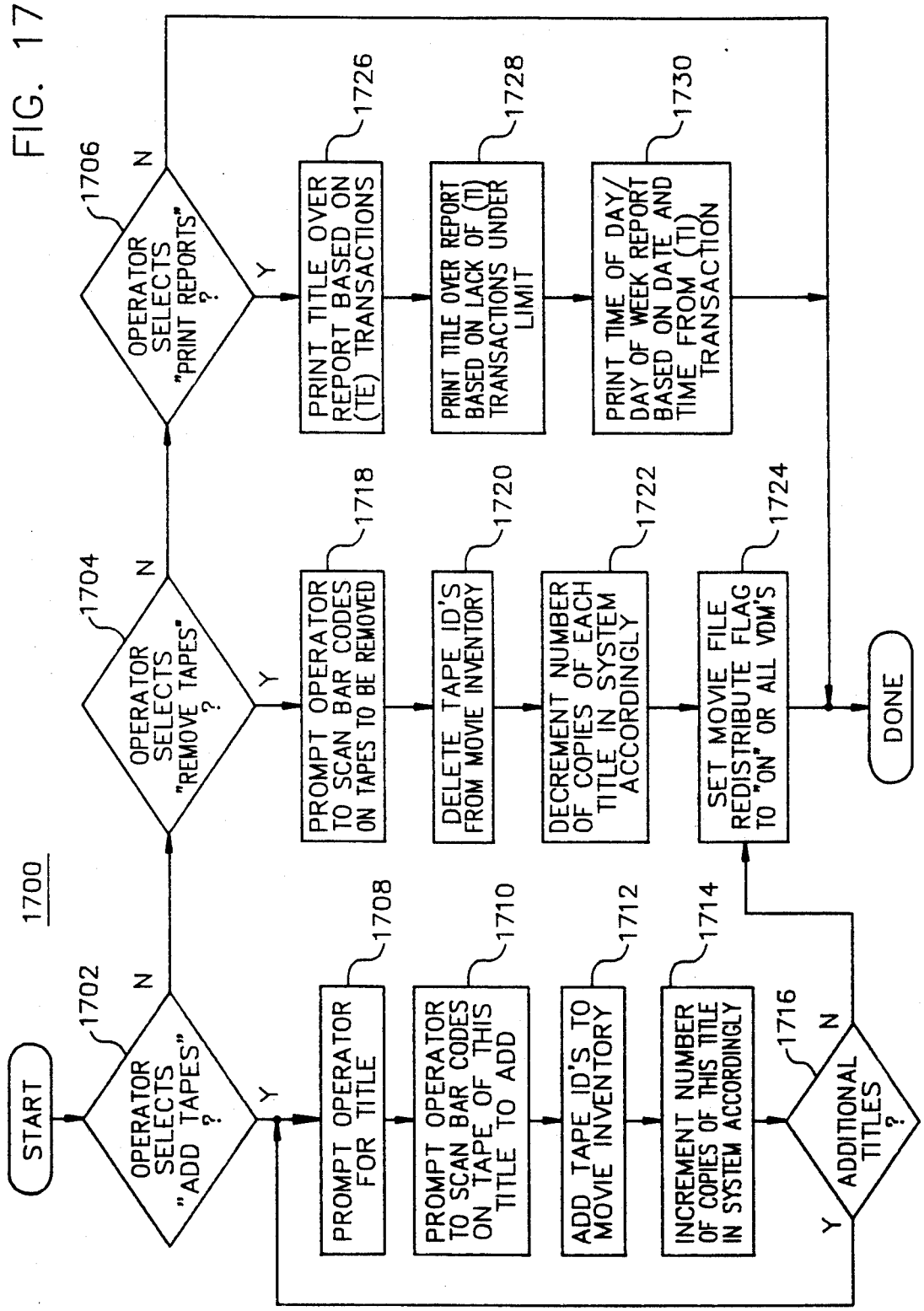
FIG. 17 is a flow diagram detailing the inventory handling system of the present invention.

Referring now to FIG. 17, the routine 1700 is invoked to perform inventory management in inventory control system 204. When invoked, decision 1702 determines whether the operator selects the "Add Tapes" option. If not, decision 1704 determines whether the operator selects the "Remove Tapes" option. If not, decision 1706 determines whether the operator selects the "Print Reports" option. If the operator selects the "Add Tapes" option item 1708 prompts the operator for the title of the article to be added to the system. Decision 1710 then prompts the operator to scan the bar codes of the article to be added. Item 1712 then adds the article's identification code to the inventory. Item 1714 then updates the inventory file to reflect the number of copies of the article currently in the system. Decision 1716 then determines whether additional articles are to be added to inventory. If so, control returns to item 1708. If not, control passes to item 1724 to set the file redistribute flag to on to indicate that the inventory file has been changed since it was last communicated to respective dispensing machines in the system 100. If in decision 1704, the operator selects the "Remove Tapes" option, item 1718 prompts the operator to scan the inventory bar code on the article to be removed from inventory. Item 1720 then deletes the article from the inventory. Control then passes to item 1722 which decrements the number of copies of the article in the system and item 1724 then sets the movie file redistribute flag to on.

If in decision 1706 the operator selects the "Print Reports" option, item 1726 prints the title short report based on TE-type transactions. Item 1728 then prints a "Title Over" report (which indicates overstock of a particular article) based on a lack of TI-type transactions under a predefined limit. Item 1730 then prints a "Time of Day/Day of Week" (which indicates the pattern of rental activity) report based on the date and time from the TI-type transactions.

Figure 18A:
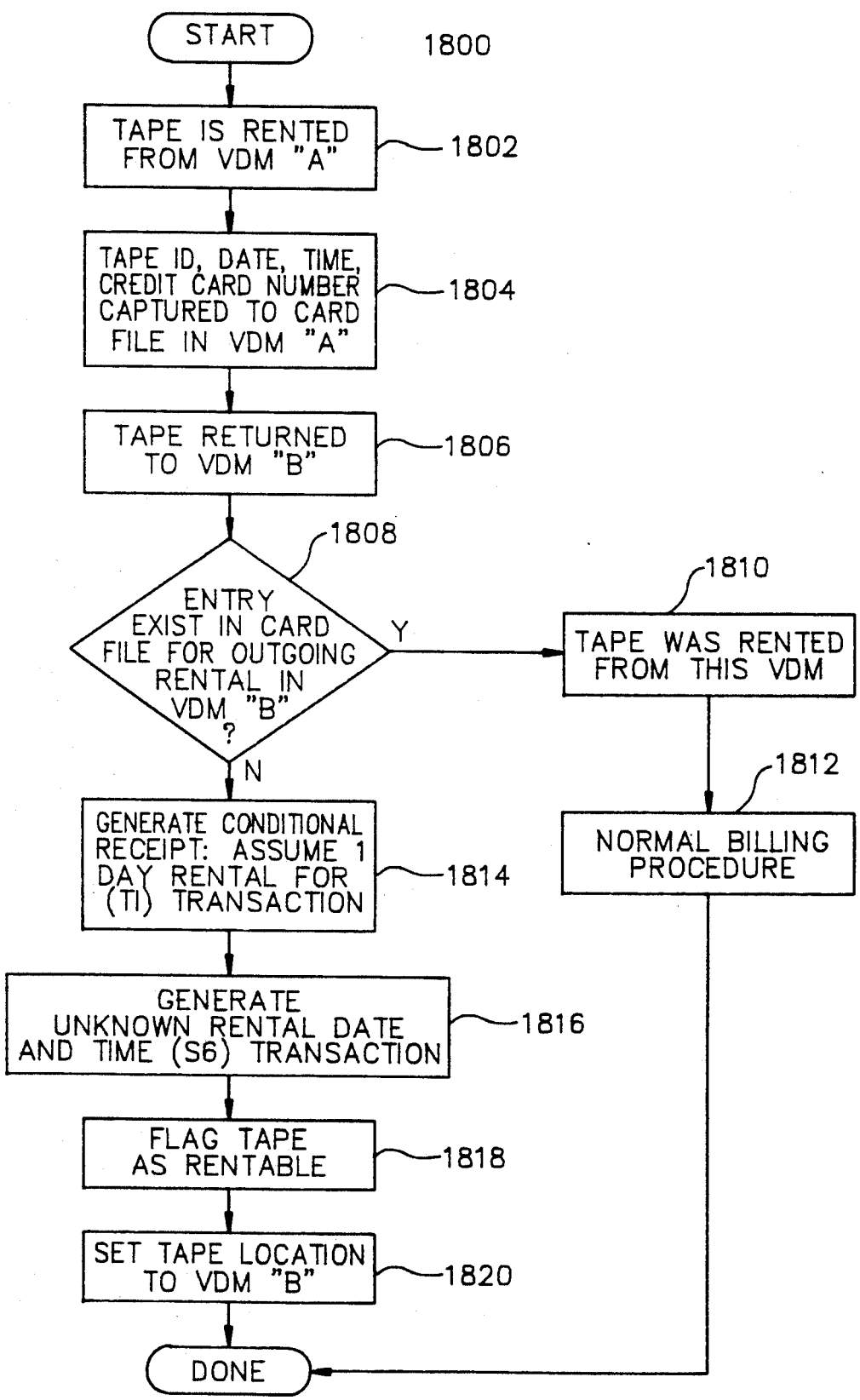

Referring now to FIG. 18A, the routine 1800 is invoked at the vending machine for inter-vending machine article rental and return. In item 1802 a tape is rented from a source vending machine wherein in item 1804 the article identification code, date and time, and credit card number are captured in the source vending machine and stored in a card file internal to the source vending machine. In item 1806 an article is returned to a destination vending machine. Decision 1808 then determines whether an entry exists in the card file for the outgoing rental in the destination vending machine. If in item 1810, the system determines the tape was rented from the destination vending machine, normal billing procedures are invoked in item 1812, as discussed above in conjunction with FIG. 5A-5C. Otherwise, item 1814 generates a conditional receipt assuming a single-day rental for the TI-type transaction. Item 1816 then generates an unknown rental date and time transaction, and item 1818 flags the article as rentable. Item 1820 then sets the tape location flag for the destination vending machine and the routine returns.

Referring now to FIG. 18B, the routine 1821 is invoked at the host 110 whenever an article removed from one vending machine is returned to another in the system. Item 1822 is invoked to receive a conditional return transaction TI-type, with an unknown rental date and time) from a different vending machine in the system 100. Item 1824 then matches the conditional return transaction with outgoing credit card rental activity from the source vending machine in the system 100. Decision 1826 then determines whether the number of rental days is equal to one. If not, 1828 adjusts the billing information accordingly, and control passes to item 1830. If the result of decision 1826 is affirmative, control passes to item 1830 which deletes the outgoing credit card rental entry from the source vending machine. Item 1832 then sets the card file redistribute flag to on for the vending machine of interest, and item 1834 updates the inventory to indicate that the article removed from the source vending machine is now located in the destination vending machine, and item 1836 sets the movie file redistribute flag to true for the source vending machine. The routine then returns.

In the summary, an improved automatic merchandise dispensing and retrieval system has been described.

Accordingly, other uses and modifications will be apparent to persons of ordinary skill without departing from the spirit and scope of the present invention and all such modifications are intended to fall within the scope of the appended claims.

APPENDIX 1

TRACE DATA TRANSACTION SPECIFICATION

All trade records will consist of the following format:

|  | Length |
|---|---|
| Record type - trace record type indicator | 2 |
| Standard trace record header - defined below | 20 |
| Type dependent information - defined below | Variable |

Standard Trace Record Hedader

| Element | Format | Length |
|---|---|---|
| Machine Identification | X(6) | 6 |
| Transaction Date | YYMMDD | 6 |
| Transaction Time | HH:MM:SS | 8 |

Type Dependent Information

| Code | Element | Format | Length |
|---|---|---|---|
| TO - Tape Out | Account Number | 9(19) | 19 |
|  | Card Type | XXX | 3 |
|  |   VIS - Visa |  |  |
|  |   MAS - Master Card |  |  |
|  |   AMX - American Express |  |  |
|  |   DIN - Diner's/CarteBlanc |  |  |
|  |   DIS - Discovery |  |  |
|  |   ATM - Internal Service Cards |  |  |
|  | Movie ID | 5(X) | 5 |
| TI - Tape In | Account Number | 9(19) | 19 |
|  | Card Type (see above) | XXX | 3 |
|  | Movie ID | 5(X) | 5 |
|  | Rent Amount | 999.99 | 6 |
|  | Tax Amount | 99.99 | 5 |
| TE - Title Empty | Requested Movie Title | X(25) | 25 |

OT - Open Transaction
                    Account Number          9(19)       19
                    Card Type               XXX          3
                    Tape ID                 X(5)         5
                    Card Name               X(26)       26
                    Expiration Date         9999         4
                    Discretionary Data      9(30)       30
                    Date Rented             9(6)         6
                    Time Rented             9(6)         6

IN - VDM Initialization (Power up)

HW - Home Wheel

E  - Error          Error Description       X(36)       36

S1 - No Tape        Account Number          9(19)       19
S2 - Wrong Tape     Bin Number              9999         4
S3 - Unknown Thing
S4 - Full Empty
S5 - Unreadable In
S6 - Unknown Card In
S7 - Unknown Tape In SX - Hot Card Hit   Account Number          9(19)       19
SY - Hot Card Hit   Card Type               XXX          3
SZ - Hot Card Hit   Card Name               X(26)       26
                    Expiration Date         9999         4

MC - Mag Card       Mag Card Data           X(79)       79
MC - Mag Card       Mag Card Error Message
                      "ERROR"               X(5)         5
BC - Bad Card       Invalid Mag Card Data   X(79)       79

APPENDIX 2

```
MC11890590031014:57:50B5420027202261764~KEEN/JAMES  N~92011010000000000001
TI11890590031014:57:595420327200261764    MAS002WX  3.49 0.21
MC11890590031015:00:03B5420327202261764~KEEN/JAMES  N~92011010000000000001
TO11890590031015:00:305420327200261764    MAS00C0Y
MC11890590031015:40:02ERROR
MC11890590031015:40:06B54510401492933~DRAKE/LYN  M~9103101000000000001000100000000000000000001
TI11890590031015:40:41451040149293?        VIS003RW
HW11890590031017:05:41
MC11890590031017:06:5B3735 610658 71006~FERREIRO/FE                ~9006880706143
TI11890590031017:07:25Parenthood
TE11890590031017:07:34Parenthood
TE11890590031017:07:53Parenthood
TO11890590031017:07:57Parenthood
MC11890590031017:24:01B5420327202435135~ELLIS/JOHN  J~91081010000000000001
TI11890590031017:24:355420327202435135     MAS002T4  0.00 0.00
MC11890590031017:24:48B5420327202435135~ELLIS/JOHN  J~91081010000000000001
TO11890590031017:25:345420327202435135     MAS00C9C
HW11890590031017:46:01
TO11890590031017:46:1537331306207108       AMX0030G
MC11890590031110:11:13B5420327200261764~KEEN/JAMES  N~92011010000000000001
HW11890590031110:12:16
TI11890590031110:12:265420327200261764     MAS00C0Y  3.49 0.21
MC11890590031110:34:12B45104014929?3~DRAKE/LYN  M~9103101000000000001000100000000000000000002
TI11890590031110:34:274510401492933        VIS003RW  3.49 0.21
MC11890590031114:34:13B5420327202435135~ELLIS/JOHN  J~91081010000000000001
HW11890590031114:34:20
TI11890590031114:34:355420327202435135     MAS00C9C  3.49 0.21
MC11890590031115:26:49B3735 610658 71006~FERREIRO/FE                ~9006880706143
TI11890590031115:27:123735610658710006     AMX00C49  3.49 0.21
MC11890590031115:41:35ERROR
MC11890590031115:42:52ERROR
MC11890590031115:43:06B3733 094066 32004~MELLIN/PR                  ~9004880404274
TI11890590031115:43:294510406784193        VIS00C04  3.49 0.21
MC11890590031116:24:15B3733 130820 71008~ANDER/GA                   ~9006880504201
TI11890590031116:24:30373313082071008      AMX0030G  2.49 0.15
MC11890590031116:50:14B4503750154048~TIERNEY/JILL                   ~91091010000001010001
HW11890590031116:50:16
TI11890590031116:50:264503750154048        VIS0031F  6.98 0.42
MC11890590031121:12:16B4537021417487~SKIDMORE/GORDON E.MR~90031010000000000001
HW11890590031121:12:20
TI11890590031121:12:484537021417487        VIS00D26  3.49 0.21
MC11890590031122:01:47B4537021417487~SKIDMORE/GORDON E.MR~90031010000000000001
MC11890590031215:41:00B4503750000969~MCPHIE/CAROL                   ~91091010000001010001
MC11890590031215:41:47B4503750000969~MCPHIE/CAROL                   ~91091010000001010001
TO11890590031215:42:294503750000969        VIS00C49
MC11890590031319:32:16B4503750243866~DUFVA/DAVID J                  ~91091010000001010001
TO11890590031319:32:434503750243866        VIS00D26
MC11890590031407:57:30B4503750243866~DUFVA/DAVID J                  ~91091010000001010001
TI11890590031407:57:444503750243866        VIS00D26  3.49 0.21
IN11890590031415:12:20
MC11890590031415:12:26B4520772028752~LUDTKE/KEITH A.MR~90031010000000000001
TO11890590031415:12:344520772028752        ATM002T4
MC11890590031415:12:45B4520772028752~LUDTKE/KEITH A.MR~90031010000000000001
TI11890590031415:12:524520772028752        ATM002T4  0.00 0.00
MC11890590031415:53:57B4503750000969~MCPHIE/CAROL                   ~91091010000001010001
TI11890590031415:54:044450375000096?       VIS00C49  3.49 0.21
MC11890590031417:13:47B4505320631301~BERNARD/DOLORES                ~92021010000000041001
TI11890590031417:13:454503320631301        VIS0F265
MC11890590031421:11:12B45104047246652~KOTKE/MICHAEL H~90061010000000000001000100000000000000000
TI11890590031421:11:164510404724662        ATM00E55
MC11890590031421:11:31B45104047246602~KOTKE/MICHAEL H~90061010000000000001000100000000000000000
TI11890590031421:11:074510404724662        ATM00E55  0.00 0.00
```

```
MC1289024003019:34:54ERROR
I-12890290030217:51:5?
E 12890290030217:51:52157Device I/O Error              00
MC1289029003018:08:15B4510412281291~TILLOTSON/ANNA MARIA     ~9004101000000000020001
TO1289029003018:09:204510412281291     VIS00C8C
MC1289029003019:12:37B51924107107814180STRANG/HAROLD F~9203101000000000000001
T 1289029003019:13:1251924107107-1418    MAS00C4K
MC1289029003019:40:43B4522000282574~MITCHELL/DAWN E.MRS~9203101000045240J
T 12890290030119:43:414522000298574     VIS002DP
MC1289029003022:39:34B4522030247828~ESHREF/RAMADAN.MR~9204101000000032601
TE1289029003022:39:40Coming To America
TO1289029003022:40:084522030247828     VIS009B8
MC1289029003023:40:14B4522030247828~ESHREF/RAMADAN.MR~9204101000000032601
MC1289029003023:19:54B3733 111267 13015~COAN/DA.          ~9073861102794
TO1289029003023:20:3737331112671-015   AMX00CPE
MC12890290030310:56:17B3733 111267 13015~COAN/DA.          ~903386110279-
HW1289029003010:56:29
TI1289029003010:56:423733111267130-5   AMX00CPE  3.49 0.21
MC1289029003011:13:21B51924107107814180STRANG/HAROLD F~9203101000000000000001
TI1289029003011:23:4151924107107-1418  MAS00C4K  3.49 0.21
MC1289029003011:12:49ERROR
MC1289029003012:13:04B4510412281291~TILLOTSON/ANNA MARIA     ~9004101000000000020001
TI1289029003012:13:224510412281291     VIS00C8C  3.49 0.21
MC1289029003012:19:39B4537002356570~ALLAN/ROGER M.MR~9106101000000000000001
TO1289029003012:20:294537002356570     VIS00D32
MC1289029003014:36:51ERROR
MC1289029003014:38:54B4522012061957~HASS/DAVID          ~9107101000000000401
EC1289029003014:38:54B4522012061957~HASS/DAVID          ~9107101000000000401
```

APPENDIX 3

Sun Mar 11, 1990

---

ISAM Database Compaction Report

---

DATABASE LISTING

Backup Database Name : Cards.bak
Original Database Name : Cards.mdb
Compacted Database Name : Cards.mdb

DATABASE TABLE & INDEX LISTING

---

TABLE : HotCards

COLUMNS:

| Column Name | Column Type | Maximum Size |
| --- | --- | --- |
| HotCardNumber | VarText | 19 |
| HotCardLevel | VarText | 1 |

NUMBER OF RECORDS: 19

INDEXES: (* = Unique)

| Index Name | Indexed Columns |
| --- | --- |
| *HotCardsIndex1 | HotCardNumber |

---

TABLE : CreditCards

COLUMNS:

| Column Name | Column Type | Maximum Size |
| --- | --- | --- |
| CreditCardTapeID | VarText | 5 |
| CreditCardNumber | VarText | 19 |
| CreditCardName | VarText | 26 |
| CreditCardType | VarText | 3 |
| CreditCardExp | VarText | 4 |
| CreditCardOther | VarText | 30 |
| CreditCardDate | VarText | 6 |
| CreditCardTime | VarText | 6 |

NUMBER OF RECORDS: 45

INDEXES: (* = Unique)

| Index Name | Indexed Columns |
| --- | --- |
| *CreditCardsIndex1 | CreditCardTapeID |
| CreditCardsIndex2 | CreditCardNumber |

ISAM Database Compaction Report

DATABASE LISTING

Backup Database Name   : Movies.bak
Original Database Name : Movies.mdb
Compacted Database Name : Movies.mdb

DATABASE TABLE & INDEX LISTING

TABLE : VdmMovies

COLUMNS:

| Column Name | Column Type | Maximum Size |
|---|---|---|
| VdmMovieTitle | VarText | 25 |
| VdmMovieRating | VarText | 4 |
| VdmMovieSubject | VarText | 8 |
| VdmMovieActor | VarText | 20 |
| VdmMovieTapeid | VarText | 5 |
| VdmMoviePrice1 | VarText | 4 |
| VdmMoviePrice2 | VarText | 4 |
| VdmMoviePrice3 | VarText | 4 |
| VdmMoviePurchase | VarText | 5 |
| VdmMovieBin | VarText | 4 |
| VdmMovieStart | VarText | 5 |
| VdmMovieEnd | VarText | 5 |

NUMBER OF RECORDS: 121

INDEXES: (* = Unique)

| Index Name | Indexed Columns |
|---|---|
| VdmMoviesIndex1 | VdmMovieTitle |
| *VdmMoviesIndex2 | VdmMovieTapeid |
| VdmMoviesIndex3 | VdmMovieBin |

APPENDIX 4

Program Name:    MAIN

Purpose:         Performs overall system control

Linkage:         None

Parameters:      None

Returns:         None

Subroutines:     OPENDATA, HOMECHIPS, HOMEWHEEL, SCREENIN, SCRNDSPL,
                 PAUSE, MAGSTRIP, CHECKCARD, RENTRTN, RENTMOVI, RTNMOVIE Includes:        COMDEF.BAS, IODEF.BAS Miscellaneous:   None

---

1. (OPENDATA) Open device ports and data files
2. (HOMECHIPS) Initialize digital interface board I/O ports
3. (HOMEWHEEL) Initialize the carousel position
4. Define selector switch light blink sequence
5. (SCREENIN) Read screen data file and create memory image
6. Toggle alternating display screen
7. Output selector switch light blink pattern
8. (PAUSE) Wait short period of time
9. (MAGSTRIP) Check to see if any mag card activity
10. If there is mag card activity then
10.1 Goto 13.
11. Get next selector switch light blink pattern
12. Goto 6.
13. (CHECKCARD) Check if mag card data is an acceptable credit card
14. If not acceptable then
14.1 Goto 6.
15. (RENTRTN) Prompt user to select RENT or RETURN
16. If user selected RENT then
16.1 (RENTMOVI) Go perform rental function
17. If user selected RETURN then
17.1 (RTNMOVIE) Go perform return function
18. If preview system is installed then
18.1 Switch display from computer to laser disk
19. Goto 6.
20. End Program Name:    OPENDATA Purpose:         Opens various devices and files Linkage:         CALL OPENDATA Parameters:      None Returns:         None Subroutines:     BTRV (Record Manager)

Includes:        COMDEF.BAS, FIELDS.BAS

Miscellaneous:   Devices opened are as follows:

3  - Communication's port (COM2)
        #7  - Laser decoder read port (COM1)
        #9  - Receipt printer (LPT1)
       #13 - Preview control port (LPT2)

Files opened are as follows:

1  - Control file (CONTROL.DTA)
        #2  - Card number file (CARDS.INV)
        #4  - Movie inventory file (MOVIES.INV)
        #5  - Screen image file (SCREEN.DTA)
        #6  - Error message file (ERRORR.DTA)
       #11 - Movie inventory file (MOVIES.INV)
           (Disk maintained Backup to #4)

---

```
1.   Open laser decoder board control port (COM1)
2.   Open communications port (COM2)
3.   Open screen image file
4.   Open error message file
5.   Open printer port (LPT1)
6.   If preview system is installed then
6.1  Open laser disk player control port (LPT2)
6.2  Set laser disk player model dependent parameters
6.3  Start laser disk player
6.4  Wait for laser disk player to come to full speed
7.   Open control file
8.   Read control file record
9.   Open card number file (BASIC)
10.  Open movie file (memory resident) (BASIC)
11.  Open movie file (disk resident) (BASIC)
12.  Initialize Btrieve record manager constants
13.  Open card number file (Btrieve record manager)
14.  Open movie file (memory resident) (Btrieve record manager)
15.  Open movie file (disk resident) (Btrieve record manager)
16.  End
```

Program Name:   HOMECHIPS

Purpose:        Initialize the Metrabyte PIO24 Digital Interface board.

Linkage:        CALL HOMECHIPS

Parameters:     None

Returns:        None

Subroutines:    TRACE

Includes:       IODEF.BAS

Miscellaneous:  None

---

1. Output control word to set port A to output, B to output, and C to input
2. Set port A to the idle state
3. Set port B to the idle state
4. (TRACE) Write trace record to indicate VDM initialization
5. End Program Name:   HOMEWHEEL Purpose:        Initialize the carousel position.

Linkage:        CALL HOMEWHEEL (CURRSLOT%)

Parameters:     CURRSLOT% - Global carousel position variable.

Returns:        CURRSLOT% - Current carousel position (1-80).

Subroutines:    TRACE, PAUSE, LASER

Includes:       IODEF.BAS

Miscellaneous:  None

---

1.   If carousel is not on a position hole then
1.1    Start carousel at fast speed
1.2    (PAUSE) Wait for 1 second
1.3    Stop carousel
1.4    (PAUSE) Wait for carousel to come to complete stop
1.5    Start carousel at slow speed
1.6    (PAUSE) Wait 4 seconds for position hole to be located
1.7    If position hole not recognized within 4 seconds goto 1.1
1.8    (LASER) Activate laser scanner to read carousel position label
1.9    If laser scanner read failed goto 1.1
1.10   set carousel position to laser scanner reading
1.11   (TRACE) Write trace record to indicate carousel position was initialized
2.   End Program Name:    MAGSTRIP Purpose:         Return any pending messages from the mag card reader Linkage:         CALL MAGSTRIP (READING$,RETURN.CODE%)

Parameters:      None

Returns:         RETURN.CODE% - 0 = Valid Message
                                1 = No Message or Error
                 READING$     - If RETURN.CODE% = 0 then message
                                                 1 then blank Subroutines:     TRACE, PAUSE Includes:        None Miscellaneous:   None

---

1. Initialize reading to blank and return code to no read
2. If no message is pending on communications port then end
3. (PAUSE) Wait for message to complete if pending
4. If message is greater than minimum length and start character is correct then
4.1 Input complete message
4.2 Eliminate control characters and adjust message size accordingly
4.3 Set return code to good read
4.4 (TRACE) Write trace record to record the mag card message information
5. If message is not ok then
5.1 (TRACE) Write trace record to record a mag card read error
6. Clear the communications input port
7. End Program Name:   CHECKCARD Purpose:        Determines whether or not the mag card reading is acceptable.

Linkage:        CALL CHECKCARD (READING$,CARDSTATUS%)

Parameters:     READING$ - Message read from mag card reader

Returns:        CARDSTATUS% - 0 = Card is acceptable
                             -1 = Card is not acceptable Subroutines:    TRACE Includes:       COMDEF.BAS, FUNCTION.BAS, FIELDS.BAS Miscellaneous:  None

---

1.  Init card status to not ok
2.  Check card message for proper length, beginning, and ending characters
3.  If not ok then
3.1 End
4.  Extract account number from card message
5.  Extract cardholder name from card message
6.  Extract expiration date from card message
7.  Extract discretionary data from card message
8.  If card expiration is older than today's date then
8.1 End
9.  Apply MOD -10 check digit algorithm to card reading
10. If check digit test failed then
10.1 End
11. Based on account number determine card type (visa, mastercard, american express, dinars club, discover)
12. If card type was determinable then set card status to ok
13. End

```
Program Name:    RENTRTN

Purpose:         Prompts customer to select RENT or RETURN option

Linkage:         CALL RENTRTN (CHOICE%)

Parameters:      None

Returns:         CHOICE% - 1 = Customer selected RENT
                           2 = Customer selected RETURN
                           0 = Customer selected CANCEL Subroutines:     SCRNDSPL, LIGHTS, PAUSE Includes:        IODEF.BAS, COMDEF.BAS Miscellaneous:   None
```
---

1. Clear key input buffer
2. (SCRNDSPL) Display Rent or RETURN prompt screen with customer's name
3. (PAUSE) Wait 30 seconds for customer to make selection
4. If customer did not make a selection then end
5. If customer did not select RENT, RETURN, or CANCEL then
5.1　Goto 3.
6. Set choice to customer's selection
7. End Program Name: RENTMOVI Purpose: Allows user to rent a movie.

Linkage: CALL RENTMOVI

Parameters: None

Returns: None

Subroutines: BTRV (Record Manager), LIGHTS, ERRORR, SCRNDSPL, PAUSE, TITLES, HOMEWHEEL, MVWHEEL, LASER, FLAGIT, PRTRENT Includes: IODEF.BAS, COMDEF.BAS, FUNCTION.BAS Miscellaneous: None

---

1. (LIGHTS) Deactivate all selector keys
2. (BTRV) User account number from mag card read card file
3. If maximum number of movies are already out on this card then
3.1 (SCRNDSPL) Display screen telling user he cannot rent more movies on this credit card
3.2 (PAUSE) Wait 10 seconds
3.3 End
4. (TITLES) Display title selections and get user response
5. If user canceled then
5.1 End
6. (SCRNDSPL) Display screen telling user to wait
7. (MVWHEEL) Move carousel to selected movie
8. (LASER) Read carousel position
9. If carousel position was unreadable then
9.1 (TRACE) Write trace record to report a carousel label read error
10. If carousel position was unreadable or mispositioned then
10.1 (HOMEWHEEL) Reinitialized carousel position
10.2 Goto 7.
11. If movie was not in bin then
11.1 (FLAGIT) Flag bin as an exception code "S1"
11.2 End
12. (LASER) Read movie id code
13. If movie id code was unreadable then
13.1 (FLAGIT) Flag bin as an exception code "S3"
13.2 End
14. If the wrong movie was in the bin then
14.1 (FLAGIT) Flag bin as an exception code "S2"
14.2 End
15. (SCRNDSPL) Display screen tell user to open access door
16. Release access door solenoid
17. (PAUSE) Wait 20 seconds for user to open access door
18. (PAUSE) Wait for user to close access door
19. Relatch access door
20. (SCRNDSPL) Display screen telling user to wait for receipt
21. If user did not remove the movie then
21.1 End
22. (BTRV) Set movie rented flag in memory resident movie file to out
23. (BTRV) Set movie rented flag in disk resident movie file to out
24. (BTRV) Insert user credit card data in card file
25. If the card file indicates that the movie was out on rental
25.1 (TRACE) Write trace record capturing the open transaction data
25.2 (BTRV) Delete the open transaction from the card file
26. (TRACE) Write record recording the current rental data
27. (PRTRENT) Print the rental receipt
28. End Program Name:   TITLES Purpose:        Prompt user to make a preview or movie selection Linkage:        CALL TITLES (CHOICE%)

Parameters:     None

Returns:        CHOICE% - Operator's selection
                        1 - 24 = Movie selection (Row on screen)
                        999 = Cancel selected Subroutines:    BTRV (Record Manager), SCRNDSPL, LIGHTS, PROMPT, ERRORR Includes:       COMDEF.BAS, IODEF.BAS Miscellaneous:  None

---

1.   (SCRNDSPL) Display user instruction at bottom of screen
2.   If preview system is installed then
2.1  (SCRNDSPL) Display message on screen so indicating
3.   Display screenfull of movie titles (24)
4.   (LIGHTS) Activate the CANCEL, MORE SELECTIONS, (down arrow),
     PREVIEW, and RENT selector keys
5.   (PROMPT) Get user selection
6    If user selected "MORE SELECTIONS" then
6.1  Set movie title index count to next set of 24 titles
6.2  Goto 3.
7.   If user selected "CANCEL" or user timeout expired then
7.1  End
8.   If user selected "RENT" but all copies are out on rental then
8.1  Display message on screen indicating all copies are out on rental
8.2  Goto 4.
9.   If user selected "PREVIEW" and preview system is active then
9.1  If preview is unavailable for the selected title then
9.1.1 Display message on screen indicating preview is unavailable
9.1.2 Goto 4.
9.2  Send command to laser disk player to play segment defined by
     start frame and end frame from movie inventory file
10.  Goto 4.

Program Name:    PRTRENT

Purpose:         Prints receipt when tape is rented.

Linkage:         CALL PRTRENT

Parameters:      None

Returns:         None

Subroutines:     TICKET

Includes:        COMDEF.BAS

Miscellaneous: None

---

1.  (TICKET) Print static information
2.  (TICKET) Print current date and time
3.  (TICKET) Print pricing information from movie data base
4.  (TICKET) Print informational messages
5.  (TICKET) Send cut command to printer
6.  End Program Name:    RTNMOVIE Purpose:         Allows user to return a movie Linkage:         CALL RTNMOVIE Parameters:      None Returns:         None Subroutines:     BTRV (Record Manager), LIGHTS, SCRNDSPL, TRACE,
                 HOMEWHEEL, MVWHEEL, LASER, ERRORR, PAUSE, FLAGIT,
                 PRTERROR, PRTRTN Includes:        IODEF.BAS, COMDEF.BAS, FUNCTION.BAS Miscellaneous: None

---

1.   (LIGHTS) Deactivate all selector keys
2.   (SCRNDSPL) Display screen telling user to wait
3.   (BTRV) Get empty bin number from movie file
4.   If there are no empty bins then
4.1  (TRACE) Write record indicating VDM is full
4.2  End
5.   (MVWHEEL) Move carousel to empty bin
6.   (LASER) Read carousel position
7.   If carousel position was unreadable then
7.1  (TRACE) Write trace record to report a carousel label read error
8.   If carousel position was unreadable or mispositioned then
8.1  (HOMEWHEEL) Reinitialize carousel position
8.2  Goto 5.

9.  If the bin was full then
9.1  (FLAGIT) Flag bin as exception code "S4"
9.2  End
10. (SCRNDSPL) Display screen telling user to insert movie
11. Release access door solenoid
12. (PAUSE) Wait 20 seconds for user to open access door
13. (PAUSE) Wait for user to close access door
14. Relatch access door
15. (SCRNDSPL) Display screen telling user to wait for receipt
16. If user did not return a movie then
16.1 End
17. (LASER) Read movie id code
18. If movie id was unreadable then
18.1 (FLAGIT) Flag bin as an exception code "S5"
18.2 Set rental amount to 1 day
18.3 Calculate tax amount
18.4 (TRACE) Write trace record indicating a return exception
18.5 (PRTERROR) Print a conditional return receipt
18.6 End
19. (BTRV) Read card file for this movie id
20. If movie was not rented from this VDM then
20.1 (FLAGIT) Flag bin as an exception code "S6"
20.2 Set rental amount to 1 day
20.3 Calculate tax amount
20.4 (TRACE) Write trace record indicating a return exception
20.5 (PRTERROR) Print a conditional return receipt
20.6 End
21. (BTRV) Delete the transaction from the card file
22. (BTRV) Set movie rented flag in memory resident movie file to in
23. (BTRV) Set movie rented flag in disk resident movie file to in
24. If movie was returned to a different bin than it was rented from then
25. (BTRV) Swap movie inventory records to adjust for bin change
26. Calculate number of days movie was out on rental
27. If movie was out for less than 10 minutes then
27.1 Set number of rental days to 0
28. Calculate rental amount based on rental days and rental price
29. Calculate tax amount
30. (TRACE) Write trace record indicating the return transaction
31. (PRTRTN) Print the customer's return receipt
32. End Program Name:    PRTRTN Purpose:         Prints receipt when tape is returned.

Linkage:         CALL PRTRENT ( RENT.AMOUNT$,TAX.AMOUNT$)

Parameters:      RENT.AMOUNT - Amount of base rental charge
                 TAX.AMOUNT  - Amount of sales tax charged Returns:         None Subroutines:     TICKET Includes:        COMDEF.BAS Miscellaneous:   None

---

1. (TICKET) Print static information
2. (TICKET) Print current date and time
3. (TICKET) Print rent, tax and total charge amounts
4. (TICKET) Print informational messages
5. (TICKET) Send cut command to printer
6. End Program Name:    PRTERROR Purpose:         Prints receipt when an error is encountered on a tape return.

Linkage:         CALL PRTERROR (RENT.AMOUNT$,TAX.AMOUNT$,FLAG$)

Parameters:      RENT.AMOUNT - Amount of base rental charge
                 TAX.AMOUNT  - Amount of sales tax charged
                 FLAG$       - 5 = An unreadable tape was returned
                               6 = A tape from another VDM was returned Returns:         None Subroutines:     TICKET Includes:        COMDEF.BAS Miscellaneous:   None

---

1.   (TICKET) Print static information
2.   (TICKET) Print "Conditional Receipt" on receipt
3.   If tape label was unreadable then
3.1  (TICKET) Print "Not Readable" on receipt
4.   If tape was from a different VDM then
4.1  (TICKET) Print "Non Stocked ID" on receipt
5.   (TICKET) Print current date and time
6.   (TICKET) Print rent, tax and total charge amounts
7.   (TICKET) Print informational messages
8.   (TICKET) Send cut command to printer
9.   End Program Name:   FLAGIT Purpose:        Flags bins as exceptions occur during the rent or
                return cycle.

Linkage:        CALL FLAGIT (ERROR.CODE$,BADID$)

Parameters:     ERROR.CODE$ - Exception error code as defined below
                BADID$      - Exception causing bin ID number Returns:        None Subroutines:    BTRV (Record Manager), TRACE Includes:       COMDEF.BAS Miscellaneous:  The current exception error codes are defined as
                follows:

From the rent cycle:

S1 - Bin that should have contained the requested
                         tape was empty
                    S2 - Bin that should have contained the requested
                         tape contained a different tape
                    S3 - Unsuccessful attempt to read the requested
                         tape's bar code id From the return cycle:

S4 - Bin that should have been empty was full
                    S5 - Unsuccessful attempt to read the returned
                         tape's bar code id
                    S6 - Tape was not rented from this VDM

--------------------------------------------------------------------

1.   (BTRV) Set bin number in memory resident movie file to exception
     status
2.   (BTRV) Set bin number in disk resident movie file to exception
     status
3.   If error code is type S5 or S6 then
3.1  Get user's credit card account number for trace record
4.   (TRACE) Write trace record to report the exception
5.   End Program Name:   MVWHEEL Purpose:        Perform carousel position function.

Linkage:        CALL MVWHEEL (CURRSLOT%,BIN%,DESTSLOT%)

Parameters:     CURRSLOT% - Global carousel position variable
                BIN%      - Logical destination bin (1-120)

Returns:        DESTSLOT% - Physical destination bin after move (1-80)

Subroutines:    HOMEWHEEL, PAUSE

Includes:       IODEF.BAS

Miscellaneous:  None

---

1. If carousel position array has not been initialized then
1.1   Define inner carousel ring positions
1.2   Define middle carousel ring positions
1.3   Define outer carousel ring positions
2. Using carousel position array convert logical destination bin to physical destination bin
3. If current bin equals destination bin then end
4. Determine and set direction based on shortest distance between current bin and destination bin (clockwise or counter-clockwise)
5. If carousel is not on a position hole then
5.1   (HOMEWHEEL) Reinitialize carousel position
5.2   Goto 3.
6. If number of position holes to move equal 1 then
6.1   Start carousel at slow speed
6.2   (PAUSE) Wait to get off of current carousel position hole
6.3   Goto 11.
7. Start carousel at fast speed
8. While number of position holes to move is greater than 1
8.1   (PAUSE) Wait to get off of current carousel position hole
8.2   (PAUSE) Wait to get on next carousel position hole
8.3   Decrement number of position holes to move
9. Stop carousel
10. Start carousel at slow speed
11. (PAUSE) Wait to get on next carousel position hole
12. Stop carousel
13. If carousel failed to get position in alloted time then
13.1 If retry count has been exhausted then
13.1.1  (ERRORR) Catastrophic error - shut down the system
13.2 (HOMEWHEEL) Reestablish carousel position
13.3 Goto 3.
14. End Program Name:   LASER Purpose:        Fires laser read heads for the tape bins and the carousel position.

Linkage:        CALL LASER (READING$,RETURN.CODE%,LENGTH%,HEAD%)

Parameters:     LENGTH% - Expected message length, excluding the label check digit character
                HEAD%   - Laser head to fire: 1, 2, or 4 for tape bins or 3 for carousel position Returns:        RETURN.CODE% - 0 = Valid Read
                               1 = No Read (Error)
                READING$     - If RETURN.CODE% = 0 then reading
                                              = 1 then spaces Subroutines:    PAUSE Includes:       IODEF.BAS Miscellaneous: None

------------------------------------------------------------------------

1.     Initialize reading to blank and return code to no read
2.     Define MOD 43 conversion array
3.     Send read activation command to communications port
4.     (PAUSE) Wait .25 seconds
5.     Get response from communications port
6.     If response is not equal to no read message (?????) then
6.1    Perform MOD 43 check sum calculation algorithm on response
6.2    If MOD 43 check digit of response is ok then
6.2.1  Set reading equal to response message
7.     If reading is blank then
7.1    If retry count has been exhausted then end
7.2    Start carousel
7.3    (PAUSE) Wait short time for carousel to jog
7.4    Stop carousel
7.5    Goto 3.
8.     Set return to good read
9.     End Program Name:   TICKET Purpose:        Performs all printing functions.

Linkage:        CALL TICKET (MSG$)

Parameters:     MSG$ - Control characters and message to be printed

Returns:        None

Subroutines:    None

Includes:       None

Miscellaneous:  The first 4 characters of MSG$ are the control
                characters and are defined as follows:

character 1 - Print mode:   S = Standard
                                            E = Extended
                          2 - Cut flag:     C = Cut after print line
                                              = No cut
                          3 - Justify:      L = Left
                                            R = Right
                                            C = Center
                          4 - Line Feed:    0-9 = Number of blank lines
                                                  before print line
                          5 - Beginning of print message

--------------------------------------------------------------------

1. Strip print codes off first 4 positions of print line
   (print mode, cut flag, justification, and line feeds)
2. Adjust message length if necessary to 40 for standard print or
   20 for extended print
3. Print line feeds as specified by print code
4. Insert standard or extended printer control code into print line
   based on print code
5. Insert left, center, or right justification printer control code
   into print line based on print code.
6. insert message into print line
7. send print line to the printer
8. If cut flag print code is set then
8.1 Send printer control code for cut to the printer
9. End Program Name: LIGHTS Purpose: Illuminate the operator selector switch lamps Linkage: CALL LIGHTS (X%)

Parameters: X% - Bit mapped lamp control byte

Returns: None

Subroutines: None

Includes: IODEF.BAS

Miscellaneous: Bit map is defined as follows:

Bit 0 - Rent Lamp
        1 - Return Lamp
        2 - Preview Lamp
        3 - "Down Arrow" Lamp
        4 - Unused
        5 - More Selections Lamp
        6 - Unused
        7 - Cancel Lamp Outputting a 0 will turn the lamp and a 1 will turn off the lamp. Bits may be combined to turn on any combination of lamps.

---

1. Invert control byte and insert into output word
2. Output the output word
3. End Program Name:   PAUSE Purpose:        Delay various amounts of time while waiting for events
                to occur.

Linkage:        CALL PAUSE (TICKS,EVENT%,TIMEOUT%)

Parameters:     TICKS  - Amount of time to wait in seconds
                EVENT% - Activitiy to wait for Returns:        TIMEOUT$ - 0  = Event did not occur (timeout)
                          -1 = Event did occur (timer terminated)

Subroutines:    KEYPRESS (External)

Includes:       IODEF.BAS

Miscellaneous:  The events are defined as follows:

| EVENT% | Activity |
|---|---|
| 0 | Wait forever, timeout flag is inactive |
| 1 | Wait for time to expire, timeout flag is not applicable |
| 2 | Wait for selector key to be depressed |
| 3 | Wait for access door to be opened |
| 4 | Wait for access door to be closed |
| 5 | Wait for carousel to position on a hole |
| 6 | Wait for carousel to position off a hole |

For activities 2 - 6 if time expires prior to the
event taking place then the timeout flag will be set
as follows:

0 - Event did not take place
-1 - Event did take place

For all activities if the wait time parameter is passed
as 0.0 then the PAUSE will wait forever for the
activity to take place. (Thus, if time is set to 0.0
for activity 1 (time wait only) the routine will never
terminate.

---

1.  Initialize timeout parameter to 0 (event timeout by default)
2.  Calculate delay termination time by adding wait time parameter
    to the current time
3.  If wait time parameter = 0 then
3.1  Set delay termination time to maximum + 1 (no timeout)
4.  If event specified by event parameter has taken place then
4.1  set timeout parameter to -1 (event took place before timeout)
4.2  end
5.  If time has not yet expired then
5.1   Goto 4.
6.  End Program Name: TRACE Purpose: Captures all machine operational activities on disk Linkage: CALL TRACE (CODE$,PARM1$,PARM2$,PARM3$,PARM4$)

Parameters: CODE$ - Specific trace activity code
- Activity code dependent data parameters Returns: None Subroutines: None Includes: None Miscellaneous: Current defined trace codes are as follows:

```
IN - VDM power up or reset
HW - Carousel home function took place
MC - Mag Card was inserted in reader
BC - Invalid mag card data was read (bad card)
TO - Tape (movie) was rented (tape out)
TI - Tape (movie) was returned (tape in)
TE - Title was requested but was out (title empty)
OT - Open transaction was closed automatically
E  - Messages from the error handler
Sn - Tape related soft errors specifically defined
     by subcode n (i.e. damaged and unreadable
     tape label on a tape return)
     These are reconciled by the main office
```

---

1. Reformat system date for trace transaction
2. Insert trace code, VDM serial number, current date and time, and trace code dependent parameters into the trace transaction
3. Open trace file
4. Write trace record
5. Close trace file
6. End Program Name:   ERRORR Purpose:        System error handler Linkage:        CALL ERRORR (ERRNUM%,RTNCODE%)

Parameters:     ERRNUM%  - System error number
                RTNCODE% - Return code from initiator off error if
                           available Returns:        None Subroutines:    TRACE, LIGHTS, PAUSE Includes:       IODEF.BAS Miscellaneous:  The system error number are defined in the file
                ERRORR.DTA which is memory resident.

Associated in the error file is an error number
                dependent flag that determines whether or not the
                error is teminal or simply a warning.

Terminal errors halt VDM execution and instruct the
                user to contact service while warnings will print
                various messages on the screen and allow processing
                to continue

---

1.  Shut off power to carousel drive motor and access door solenoids
2.  Using error number parameter error information from error file
3.  Print the error number, error description, return code parameter,
    and current time and date on the screen
4.  Print message on the screen instructing user to record the above
    information and contact service
5.  If error is terminal then
5.1 Close all communication ports and files
5.2 (PAUSE) Wait forever with error information on screen
6.  (PAUSE) Wait until user presses a selector key to continue
7.  End Program Name:   SCREENIN Purpose:        Inputs a sequential disk file and builds memory images
                for screen output Linkage:        CALL SCREENIN (CTRL%(),P$(),S$())

Parameters:     None

Returns:        Screen image arrays:   CTRL% - Array containing message
                                               row, column, foreground,
                                               and background colors
                                       P$    - Array containing flag
                                               indicating if the message
                                               is display only or
                                               display and prompt
                                       S$    - Array containing the
                                               screen message Subroutines:    None Includes:       None Miscellaneous: None

---

1. While screen disk file is not at end of file
1.2 Read record from disk file
1.3 Parse record into row, column, prompt or select, forground color, background color, and screen message memory arrays
2. End Program Name:   SCRNDSPL Purpose:        Displays a screen on the monitor Linkage:        CALL SCRNDSPL (SCRN%,CTRL%(),P$(),S$())

Parameters:     SCRN% - Screen number to display
                Screen image arrays:  CTRL% - Array containing message
                                              row, column, foreground,
                                              and background colors
                                      P$    - Array containing flag
                                              indicating if the message
                                              is display only or
                                              display and prompt
                                      S$    - Array containing the
                                              screen message Returns:        None Subroutines:    ERRORR Includes:       None Miscellaneous:  None

---

1. If screen number is not in memory array then
1.2 (ERRORR) Catastrophic error - quit
2. If a screen header record does not exist then
2.1 (ERRORR) Catastrophic error - quit
3. If prompt array element indicates a clear screen then
3.1 Clear the entire screen
4. While display lines exist for this display screen
4.1 Using row, column, foreground color, and background color from the message control arrays output the message to the screen
4.2 Get next display line
5. End Program Name:   PROMPT Purpose:        Returns a user selection from a prompt type display Linkage:        CALL PROMPT (SCRN%,CTRL%(),P$(),S$(),CHOICE%)

Parameters:     SCRN% - Screen number to retrieve choice from
                Screen image arrays:  CTRL% - Array containing message
                                              row, column, foreground,
                                              and background colors
                                      P$    - Array containing flag
                                              indicating if the message
                                              is display only or
                                              display and prompt
                                      S$    - Array containing the
                                              screen message Returns: CHOICE% - 1 to 24 Rental selection from screen
25 to 48 Preview selection from screen
101 Display more selections on screen
105 Return key pressed
999 Cancel key pressed to screen
time out occurred
-1 Screen not found - system error Subroutines: ERRORR, PAUSE Includes: IODEF.BAS Miscellaneous: None

---

1. If screen number is not in memory array then
1.2 Set return to -1 (error)
1.3 End
2. Locate first user select line
3. If user select line does not exist then
3.1 (ERRORR) Catastrophic error
3.2 Set return to -1 (error)
3.3 End
4. Display "arrow" at user select line
5. (PAUSE) Go get user input
6. If user hit the "CANCEL" key or timeout occurred then
6.1 Set return to "999"
6.2 End
7. If user hit the "down arrow" key then
7.1 Get next user select line
7.2 Goto 4.
8. If user hit the "MORE SELECTIONS" key then
8.1 Set return to "101"
8.2 End
9. If user hit the "RENT" key then
9.1 Set the return to the screen line selected (1 - 24)
9.2 End
10. If user hit the "PREVIEW" key then
10.1 Set the return to the screen line selected (1 - 24) plus 25
10.2 End
11. If user hit the "RETURN" key then
11.1 Set the return to "105"
11.2 End
12. Goto 5.

APPENDIX 5

N A B A N C O

ELECTRONIC FILE SPECIFICATIONS

FOR BATCH AUTHORIZATION AND CLEARING SERVICES

9/88

ELECTRONIC FILE SPECIFICATIONS
FOR BATCH AUTHORIZATION AND CLEARING SERVICES

NaBANCO merchants wishing to submit bankcard and T&E transactions in a batch format for both authorization and clearing (billing) purposes may do so by formatting their sales drafts and credit vouchers into the record structure described in the attached documents. A magnetic file may be submitted via courier or delivery service, or the file may be transmitted over a dial-up telephone circuit if the merchant has the necessary telecommunications equipment.

A merchant is initially set up as 1 PASS (all approvals are automatically input to billing) or 2 PASS (merchant sends separate files for authorization and billing).

AUTHORIZATION
A merchant file is sent to NaBANCO for authorization and a file containing the authorization results is sent back to the merchant (file type identified by 'MERC' in positions 77-80).

1 Pass

If the Authorization Field contains '##' in the first 2
  positions, or all spaces, then the transaction is sent out for
  authorization. Anything else will be considered to be an
  authorization code (previously approved) and will not be
  authorized again. Those transactions with approval responses
  (and pre-approved) will be output to a billing file.

2 Pass
  The incoming file is input to the authorization system.
  All transactions should contain '##' in the first 2 positions
  of the authorization field. The header record is checked for
  'BILL' in positions 77-80. If found, the file is rejected.

BILLING
  1 Pass
  NaBANCO has created the billing file as described above.

2 Pass
  The incoming file is input to the billing system. The
  header record is checked for 'AUTH' in positions 77-80. If
  found, the file is rejected.

The file must contain the following types of records:

(1) _File Header_ - This record contains the merchant name, the file creation date, merchant number and, optionally, the merchant's processing date. The processing date is described as one day's transactions as defined by the merchant. For 2 Pass merchants, the file type is identified as authorization or settlement to assure that an authorization file cannot be mistakenly run through billing and vice versa. There must be only one header and it must be the first record on the file.

(2) _Detail Record_ - The detail records contain the sales (credit) data to be authorized or billed to the cardholder. The sales and credit records may be intermixed. All details for each different merchant number are grouped together followed by a summary record for that merchant number. Generally, the details are all for the same transaction date, but multiple transaction dates within a single summary may be accommodated. There is no limit to the number of details allowed within a single summary.

(3) _Summary Record_ - A merchant summary record contains the net sales amount of the preceding detail records. The summary trancode must be a "71" if the net sales amount (sales minus credits) of the details is a credit amount. Trancode "70" is for debit summaries.

(4) _File Trailer_ - A batch trailer record must follow the last summary record and must be the last record on the file. The Batch Amount is the net amount of all preceding summary records. Batch amount is calculated by adding debit summaries (TC 70) and subtracting credit summaries (TC 71). If the batch amount is a credit amount, trancode "85" must be used. Trancode "80" is used for debit batches. Record count is the total number of data records on the file including the trailer record.

The file may contain one or more transaction days and up to ten (10) magnetic tapes will be processed by NaBANCO on the same day.

If the file is transmitted to NaBANCO, the record count in the File Trailer record is compared to a record count accumulated by the NaBANCO system. If the counts do not agree, NaBanco will contact the merchant and request retransmission. The file will not be accepted for processing by NaBANCO until the counts agree. A mutually agreeable transmission window will be established.

If a magnetic file is mailed to NaBANCO, The merchant will furnish a transmittal letter or report reflecting the total net sales amount (sales minus credits) of each or all tapes delivered. Tapes should be mailed or delivered to:

NaBANCO
    1471 SW 12th Avenue
    Pompano Beach, Florida 33060
    Attn: Input Control Clerk Files transmitted or delivered to NaBANCO before 1:00 PM (East Coast Time) Monday through Friday, excluding holidays, will be scheduled for processing the same day. Files received after 1:00 PM will be scheduled for the following workday. Files received on a holiday, Saturday or Sunday will be scheduled for the next workday.

Upon receipt of the billing file(s), NaBANCO will attempt to balance the detail transactions to the summary records on the file. If the file is out of balance, it is rejected and will not be accepted. NaBANCO will contact the merchant by telephone to report the error condition.

If all files are in balance, they are scheduled for authorization and/or the next billing processing cycle. Authorization processing is performed seven days a week including holidays. Billing processing occurs Monday through Friday of each week, excluding holidays.

After the authorization processing, a Credit Card Authorization Results report will be printed for all detail transactions that could not be approved. Transactions with invalid cardholder numbers or expiration dates will be printed along with credit declines and referral responses. Referrals occur when the card issuing bank has requested to be contacted in order to obtain an authorization. In most cases, the issuing bank wishes to verify the cardholder name and/or address.

It is necessary, therefore, that the merchant resolve all referrals and return those approved to NaBANCO on a subsequent file. The approved details are returned with an approval code in the authorization field of the detail transaction. The NaBANCO Authorization Center or the T&E company will be contacted to request authorization on referrals.

In addition to the Credit Card Authorization results report, NaBANCO will, at the merchant's request, return a file of all transactions or just the rejected transactions. The authorization field in the detail record will indicate the result of the authorization request processing. The file may be delivered by courier or transmitted if the merchant has the necessary equipment.

After the approved input transactions have been transmitted to the respective bankcard clearing system (VISA, MasterCard), the NaBANCO Accounting Department will prepare a deposit ticket or wire transfer to credit or pay the merchant. A copy of the document will be mailed to the merchant as confirmation. Payment for transactions other than bankcards is the responsibility of the respective T&E company.

If the merchant is responsible for delivering the actual sales drafts and credit source documents to NaBANCO, it should be done as soon as possible after transmission or delivery of the magnetic file. These documents should be addressed to the attention of the "Draft Retrieval Department". Transactions that rejected due to invalid cardholder numbers should be resubmitted manually or on a subsequent file when the correct account number is recovered. This will be done by NaBANCO if the source documents are retained by NaBANCO.

File Organization

- Header Record — One per file.

- Detail Records — All sales and credits for the same merchant number.

- Summary Records — Merchant number summary of all the above detail records.

- File Trailer — One per file. Total amount of all detail records on file and count of all records on file.

NOTE: Detail and corresponding summary records will be repeated for all different merchant numbers.

Magnetic Tape Specifications 80 byte record size 400 byte block size

EBCDIC code set

1600/6250 BPI recording density

No file labels (non-file mode)

Alphanumeric fields are left-justified, space filled
Numeric fields are right-justified, zero filled unless otherwise specified.

TRANSMISSION SPECIFICATIONS

Our current operating system in both the Melville and Pompano Beach Centers is OS/MVS. Installed under this base are the following:
```
    JES2
    ACF/VTAM (SNI)
    DFP/370
    RACF
```
In addition to the above Host software, there is also installed the following network software:

```
    Pompano Beach  :  ACF/NCP (SNI)
                      EP (PEP ENVIRONMENT)
    Melville       :  ACF/NCP
                      EP (EP ENVIRONMENT)
```
The front ends in both sites are 3725-1's.

JES2 is capable of communicating with a variety of remote devices, the most common ones are listed here:

```
    RJE Devices :
    2780    (BSC)
    3780    (BSC)
    VM/RSCS sites operating as a 3780 (BSC)
    3777's  (SNA)
```

In addition to RJE, JES2 also has Network Job Entry (NJE) capability, via the following:

```
    BSC NJE Links
    SNA NJE Links  (If the user has VERS 2.1 of VTAM or
                    higher for CDRM support and VERS 1.3
                    of NCP of higher)
```

It is important to remember that JES2 *never* assumes the role of secondary in an RJE session. In order for two MVS or Host sites to talk to each other, the communication must be on an application to application level. I.E.- two JES2's talking to each other, one JES2 talking to a program that appears to be a piece of hardware (VM/RSCS) or two programs such as the Cross Domain data transfer program. The Cross Domain data transfer program is a program marketed by IBM Corporation, and is licensed to each user. We (NaBANCO) cannot provide a copy to a third party. An NJE connection may also be made to a DOS/VSE shop that has POWER/PNET.

The Cross Domain data transfer program is a VTAM application program, and therefore requires a CDRM to CDRM session exist between sites in order to transfer data. If the NJE session is on a BSC line, no CDRM to CDRM is required, but if SNA NJE is used, the CDRM to CDRM session must exist. For the SNA connection, this implies that is the customer has the prerequisite software installed.

The following changes must be made to any user file transmission into our JES2. Underlined statements will be assigned by NaBANCO tech support.

```
/*SIGNON      RMTxxx
//RCVxxxx JOB(XMIT),'USER NAME(20)',CLASS=1,
//  MSGCLASS=J,USER=USERID(7),PASSWORD=USER PASSWORD(08)
//STEP01 EXEC RCVAUTH,USER=USERID(07)
//STEP0010.SYSUT1 DD *
       .
       .
       .   USER DATA HERE
       .
       .
//
/*SIGNOFF
```

The signoff may be delayed if the user wishes to receive the initial print back, if he is capable of receiving print from JES2.

The purpose of the above jobstream is to have the user sign on to JES2 as a remote, send the data, and have a proc execute to create the output file. If the job is to run at other than the receiving site, a /*ROUTE XEQ NABFLA (or NABNY)

may be inserted in the jobstream after the jobcard. The same JCL is used for an NJE link, except a different routing card is required to transfer the job from the merchant's spool to ours. In order for the user to retrieve data from us after processing is done, all they have to do is sign on and wait for JES2 to contact them, usually within 10 secs.

DIAL-UP

In a dial-up environment, the ideal situation would be for the merchant to operate as a remote device (3780-BSC) and sign on to JES2 (NaBANCO).

NaBANCO can communicate with 2400 baud (Bell 201-C) compatible and 4800 baud (Bell 208-A/B) compatible dial-up modems.

MERCHANT BANKCARD RECORD DESCRIPTIONS

FILE HEADER

| | |
|---|---|
| 1-2 | Tran Code - 00 |
| 4-19 | Merchant Name |
| 21-24 | Creation Date (MMDD) |
| 26-36 | Merchant Number (assigned by NaBanco - if multiple numbers are assigned use first sequential number) |
| 51-53 | Batch Number (zero fill) |
| 55-58 | Merchant Processing Date (MMDD) (optional) |
| 77-80 | File Type (Identifies file as authorization or billing for 2 Pass only) |

DETAIL RECORD

| | | |
|---|---|---|
| 1-2 | Tran Code : 06 = sales draft, 07 = credit voucher | |
| 3 | Credit Card Type Code | M = MasterCard<br>V = VISA<br>A = American Express<br>D = Diners Club<br>C = Carte Blanche<br>S = Discover |
| 4-19 | Cardholder Number (left-justified, right space-filled) | |
| 21-24 | Transaction Date (MMDD) | |
| 26-31 | Authorization Field - card expiration date, approval code or authorization response. | |

On Credit Requests:  Expiration Date    = ##MMYY
                                            s s s s
                     No Expiration Date = ## p p p p  or spaces Approval Code      = XXXXXX (sale approval
                                            was previously received
                                            by merchant.

On Credit Responses:   Approval Code = XXXXXX (sale approved
                                            by NaBANCO)

Response Code = ****?? (see page 15 for
                                            value of ??)

It is conceivable for the authorization field to be returned unchanged (i.e. ##---- or 6 spaces).

If this happened on an entire file, it would mean that the input file was returned, in place of the merchant response file. Checking the Header Record for 'MERC' (Pos. 77-80) would identify this situation. Call NaBANCO to receive the correct file.

If this happened on a single transaction, it would have to be recognized and reauthorized.

The procedure for handling the response file should be as follows:

| IF AUTHORIZATION FIELD CONTAINS: | DEFINITION: |
|---|---|
| ##MMYY<br>##SpSpSpSp<br>ALL SPACES | UNKNOWN<br>(RE-AUTHORIZE) |
| ****?? | NON-APPROVAL<br>(SEE PAGE 15) |
| ANYTHING ELSE | APPROVAL |

33-40 Transaction Amount(Unsigned-Tran Code identifies debit or credit)

42-54 Reference Number-assigned by merchant to identify sale or credit in the event of customer or issuing bank inquiry, draft retrieval request or chargeback.

58-80 Charge Description-A descriptor unique to each transaction that must be on the cardholder bill to identify purchase or service (order #, phone #, item description, subscription date, etc.). Usually, the descriptor associated with each merchant # (on our file) is sufficient.

SUMMARY RECORD 1- 2 Tran Code - 70 = debit summary, 71 = credit summary 4- 14 Merchant Number (assigned by NaBANCO)

33-40 Net Sales Amount - total sales drafts minus credit vouchers of the preceding detail records.

FILE TRAILER 1-2 Tran Code - 80 = debit batch, 85 = credit batch 42-49 Batch Amount - This is the Net Sales Amount of all preceding summary records.

51-56 File Record Count - Count of all records on the file including this record.

FILE HEADER RECORD

| Position | Length | Data Type | Field Name | Comments |
|---|---|---|---|---|
| 1 | 2 | 9 | Trancode | 00=Header |
| 3 | 1 | X | Separator | Space |
| 4 | 16 | X | Merchant Name | |
| 20 | 1 | X | Separator | Space |
| 21 | 4 | 9 | Tape Creation Date | Month-Day (MM-DD) |
| 25 | 1 | X | Filler | Spaces |
| 26 | 11 | X | Merchant Number | Assigned by NaBANCO |
| 37 | 14 | X | Filler | Spaces |
| 51 | 3 | 9 | Batch Number | Zeroes |
| 54 | 1 | X | Separator | Space |
| 55 | 4 | 9 | Merchant Processing Date | Month-Day(MMDD) (Optional) |
| 59 | 18 | X | Filler | Spaces |
| 77 | 4 | X | File Type | 'AUTH' or 'BILL' (Spaces for 1 Pass) |

DETAIL RECORD

| Position | Length | Data Type | Field Name | Comments |
|---|---|---|---|---|
| 1 | 2 | 9 | Trancode | 06=Sales Draft<br>07=Credit Voucher |
| 3 | 1 | X | Card Type Code | M=Master Card<br>V=VISA<br>A=American Express<br>D=Diners Club<br>C=Carte Blanche<br>S=Discover |
| 4 | 16 | X | Cardholder Number | Left-Justified<br>Right-space filled |
| 20 | 1 | X | Separator | Space |
| 21 | 4 | 9 | Transaction Date | Month-Day (MMDD) |
| 25 | 1 | X | Separator | Space |
| 26 | 6 | X | Authorization Field | One of the following:<br>-Spaces<br>-Expiration date<br>-Approval code<br>-Response code |
| 32 | 1 | X | Separator | Space |
| 33 | 8 | 9 | Transaction Amount | Two Decimals |
| 41 | 1 | X | Separator | Space |
| 42 | 13 | X | Reference Number | Defined by Merchant |
| 55 | 3 | X | Filler | Spaces |
| 58 | 23 | X | Charge Description | Defined by Merchant |

SUMMARY RECORD

| Position | Length | Data Type | Field Name | Comments |
|---|---|---|---|---|
| 1 | 2 | 9 | Trancode | 70=Debit Summary<br>71=Credit Summary |
| 3 | 1 | X | Filler | Spaces |
| 4 | 11 | 9 | Merchant Number | Assigned by NaBANCO |
| 15 | 16 | X | Filler | Spaces |
| 31 | 10 | 9 | Net Sales Amount | Two Decimals |
| 41 | 1 | X | Separator | Space |
| 42 | 8 | 9 | Filler | Zeroes |
| 50 | 31 | X | Filler | Spaces |

FILE TRAILER RECORD

| Position | Length | Data Type | Field Name | Comments |
|---|---|---|---|---|
| 1 | 2 | 9 | Trancode | 80=Debit Batch<br>85=Credit Batch |
| 3 | 37 | X | Filler | Spaces |
| 40 | 10 | 9 | File Batch Amount | Net Deposit Amount or Net Sales Amount |
| 50 | 1 | X | Separator | Space |
| 51 | 6 | 9 | File Record Count | Count of all records on file |
| 57 | 24 | X | Filler | Spaces |

LIST OF RESPONSE CODES

NN - Invalid Cardholder Number

ND - Sale Declined

NE - Sale Declined, expired card

NC - Sale Declined, pick up card

F1 - Sale Declined, card used was reported lost or stolen.

NR - Sale Referred, please call NaBANCO Authorization Center.

NS - Invalid Transaction

We claim:

1. An improved system for dispensing and receiving article, said system comprising: a plurality of vending machines adapted for dispensing and receiving articles, said vending machines including: a carousel having a plurality of bins for storing articles wherein articles may be placed in or removed from said bins through an access door a positioning system for aligning said bins with said access door, and controlling the rotation of said carousel, a control computer, said control computer including: means for recording customer billing information, means for tracking machine inventory, and data communication means; and host computer means including: means for communicating with each of said plurality of vending machines, means for receiving and processing said recorded customer billing information, and inter-vending means for controlling inter vending of inventory of articles within said system.

2. The system of claim 1 further including means wherein each of said vending machines includes means for detecting positioning system failures and means for reporting said failures to said host computer.

3. The system of claim 1 wherein said control computer includes means for recording customer billing information, and wherein said host computer means includes means for receiving and processing said customer billing information.

4. The system of claim 1 wherein said positioning system includes:
a barcode ring disposed coaxially with the perimeter of said carousel, said barcode ring for coding the absolute position of said carousel;
a scanner for reading values on said barcode ring;
a plurality of apertures disposed about the perimeter of said carousel; and
sensor means for detecting whenever said apertures of said carousel are aligned with said sensor means.

5. The positioning system of claim 4 wherein said sensor means includes a laser diode and a solid state receiver.

6. The system of claim 1 wherein said plurality of vending machines includes a video previewing means and a random access videodisc playing system.

7. The system of claim 1, wherein said inter-vending means includes:
means for permitting vending of an article from one of said vending machines and return of the article to another of said vending machines from which location the article may be revended; and
means for transferring article vending, return and revending data to each of said means for tracking machine inventory.

8. The system of claim 1 wherein said host computer means includes inter-vending means for controlling inter-vending of video cassettes.

9. The system of claim 1 wherein said system dispenses and receives videocassettes.

10. An improved system for dispensing and receiving articles, said system comprising:
a plurality of vending machines adapted for dispensing and receiving articles, each of said vending machines including:
a carousel having a plurality of bins for storing articles wherein articles may be dispensed from or received into said bins through an access door;
a positioning system that aligns said bins with said access door and controls the rotation of said carousel;
a control computer for controlling said positioning system, said control computer further including:
machine inventory tracking means,
data communications means,
a host computer means, said host computer means including:
system communication means for communicating with each of said data communications means; and
inter-vending means including:
means for permitting vending of an article from one of said vending machines and return of the article to another of said vending machines from which location the article may be revended; and
means for transferring article vending, return and re-vending data to each of said machine inventory tracking means for updating said machine inventory tracking means.

11. The system of claim 10 wherein said positioning system includes:
a barcode ring disposed coaxially with the perimeter of said carousel, said barcode ring for coding the absolute position of said carousel;
a scanner for reading values on said barcode ring;
a plurality of apertures disposed about the perimeter of said carousel; and
sensor means for detecting whenever said apertures of said carousel are aligned with said sensor mean.

12. The positioning system of claim 11 wherein said sensor means includes a laser diode and a solid state receiver.

13. The system of claim 10 wherein said system includes a video previewing means and a random access videodisc playing system.

14. The system of claim 10 wherein said control computer includes means for recording customer billing information, and where in said host computer means includes means for receiving and processing said customer billing information.

15. The system of claim 10 wherein said system dispenses and receives videocassettes.

16. A video media inter-vending network which permits the renting of video media from on location in said inter-vending network and the return of the rented video media to another location in the network from which it can be re-rented, said inter-vending network comprising:
a plurality of video media vending machines for dispensing and receiving video media at different locations, each of said video media vending machines including: a control computer, said control computer including: means for tracking machine inventory, data communications means;
a host computer means, said host computer means including:
means for tracking network inventory,
means for controlling communications with each of said data communications means; and
inter-vending means, said inter-vending means includes:
means for permitting vending of an article from one of said vending machines and return of the article to another of said vending machines from which location the article may be revended; and
means for transferring article vending, return and re-vending data to each of said means for tracking machine inventory and means for tracking network inventory.

17. The network described in claim 16 wherein each of said video media vending machines includes:
- a carousel having a plurality of bins for storing video media wherein video media may be dispensed or received from said bins through an access door;
- a positioning system which aligns said bins with said access door and controls rotation of said carousel, said positioning system including:
- a barcode ring disposed coaxially with the perimeter of said carousel, said barcode ring for coding the absolute position of said carousel;
- a scanner for reading values on said barcode ring;
- a plurality of apertures disposed about the perimeter of said carousel; and
- sensor means for detecting whenever said apertures of said carousel are aligned with said sensor means.

18. The positioning system of claim 17 wherein said sensor includes a laser diode and a solid state receiver.

19. The network of claim 16 wherein said video media comprises a videocassette.

20. The network of claim 16 wherein said plurality of video media vending machines include:
- a video media previewing means and a random access videodisc playing system.

* * * * *